(12) United States Patent
Fujita et al.

(10) Patent No.: US 9,840,170 B2
(45) Date of Patent: Dec. 12, 2017

(54) VEHICLE SEAT

(71) Applicant: Delta Tooling Co., Ltd., Hiroshima-shi (JP)

(72) Inventors: Etsunori Fujita, Higashihiroshima (JP); Yumi Ogura, Higashihiroshima (JP); Seiji Kawasaki, Higashihiroshima (JP); Katsuhiro Inoue, Hiroshima (JP); Eiji Sugimoto, Higashihiroshima (JP); Minoru Nakamura, Hiroshima (JP); Ryuji Kuwano, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 237 days.

(21) Appl. No.: 14/762,969

(22) PCT Filed: Jan. 22, 2014

(86) PCT No.: PCT/JP2014/051309
§ 371 (c)(1),
(2) Date: Jul. 23, 2015

(87) PCT Pub. No.: WO2014/115787
PCT Pub. Date: Jul. 31, 2014

(65) Prior Publication Data
US 2015/0352986 A1 Dec. 10, 2015

(30) Foreign Application Priority Data

Jan. 23, 2013 (JP) .................................. 2013-010680
Nov. 11, 2013 (JP) .................................. 2013-233537

(51) Int. Cl.
*B60N 2/427* (2006.01)
*B60N 2/68* (2006.01)
(Continued)

(52) U.S. Cl.
CPC .......... *B60N 2/42709* (2013.01); *B60N 2/06* (2013.01); *B60N 2/427* (2013.01); *B60N 2/4221* (2013.01);
(Continued)

(58) Field of Classification Search
None
See application file for complete search history.

(56) References Cited

U.S. PATENT DOCUMENTS 3,578,376 A * 5/1971 Hasegawa ................ B60N 2/07
296/68.1
4,229,041 A * 10/1980 Werner .................... B60R 22/26
248/393

(Continued)

FOREIGN PATENT DOCUMENTS

EP  2 468 566 A1  6/2012
JP  1-85155 U  6/1989
(Continued)

OTHER PUBLICATIONS

Extended European Search Report dated Aug. 24, 2016 in Patent Application No. 14742803.1.
(Continued)

*Primary Examiner* — David E Allred
(74) *Attorney, Agent, or Firm* — Oblon, McClelland, Maier & Neustadt, L.L.P.

(57) ABSTRACT

A seat suitable for sports type automobiles with a low hip point. An energy absorbing structure part provided in a cushion frame is constituted of a substantially square frame body including a front beam and a rear beam, and stringers bridged across them and provided separately from side frames. It is structured such that belt anchor attaching members are each provided between a coupling position to a vicinity of a rear portion of upper rails of sliders and a (Continued)

coupling position of the rear beam in the stringers. When an impact force of a predetermined value or higher is applied, the stringers deform to absorb the impact force and trusses are formed after the deformation, thereby enabling to sustain a further impact force which continues to be applied.

19 Claims, 30 Drawing Sheets

(51) Int. Cl.
    *B60N 2/06*     (2006.01)
    *B60N 2/42*     (2006.01)
    *B60N 2/64*     (2006.01)
    *B60N 2/66*     (2006.01)

(52) U.S. Cl.
    CPC .......... *B60N 2/4228* (2013.01); *B60N 2/643* (2013.01); *B60N 2/646* (2013.01); *B60N 2/66* (2013.01); *B60N 2/68* (2013.01); *B60N 2/688* (2013.01)

(56) References Cited

U.S. PATENT DOCUMENTS

| | | | |
|---|---|---|---|
| 5,641,198 A * | 6/1997 | Steffens, Jr. | B60N 2/4221 297/216.13 |
| 6,089,665 A | 7/2000 | Andrigo | |
| 6,352,312 B1 | 3/2002 | Rees | |
| 6,412,864 B1 * | 7/2002 | Larson | B60N 2/242 244/122 R |
| 7,303,229 B2 * | 12/2007 | Fujita | A47C 7/14 297/216.1 |
| 8,845,019 B2 * | 9/2014 | Sawada | B60N 2/20 297/216.1 |
| 9,376,044 B2 * | 6/2016 | Fujita | B60N 2/68 |
| 2002/0167207 A1 * | 11/2002 | Larson | A47C 7/022 297/202 |
| 2004/0061363 A1 | 4/2004 | Farquhar et al. | |
| 2004/0212227 A1 | 10/2004 | Farquhar et al. | |
| 2006/0103205 A1 | 5/2006 | Farquhar et al. | |
| 2012/0217775 A1 | 8/2012 | Fujita et al. | |
| 2013/0175838 A1 | 7/2013 | Oshima et al. | |

FOREIGN PATENT DOCUMENTS

| | | |
|---|---|---|
| JP | 2011-042302 A | 3/2011 |
| JP | 2012-218456 A | 11/2012 |
| WO | WO 2012/043807 A1 | 4/2012 |

OTHER PUBLICATIONS

International Search Report dated Apr. 15, 2014, in PCT/JP2014/051309, filed Jan. 22, 2014.

\* cited by examiner

SEC.A-A

SEC.B-B

SEC.C-C

SEC.D-D

SEC.E-E
(OUTER SIDE)

SEC.E-E
(INNER SIDE)

SEC.F-F

FIG. 25A
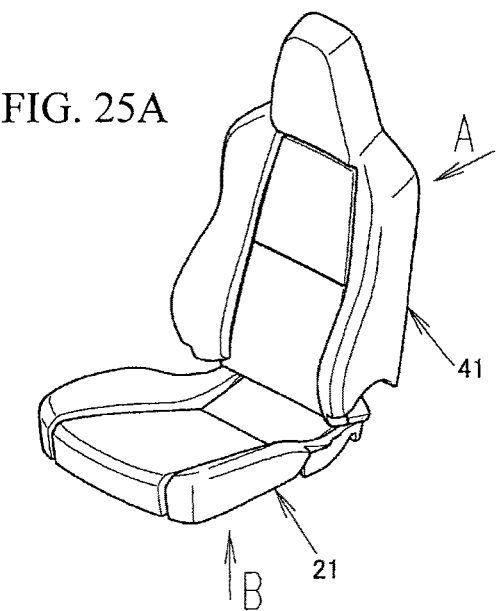
FIG. 25C
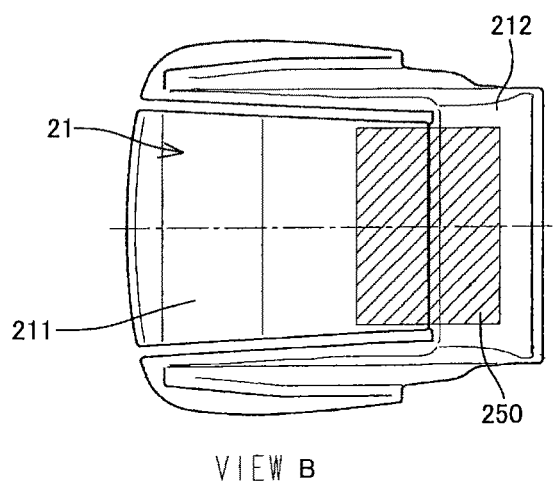
VIEW B
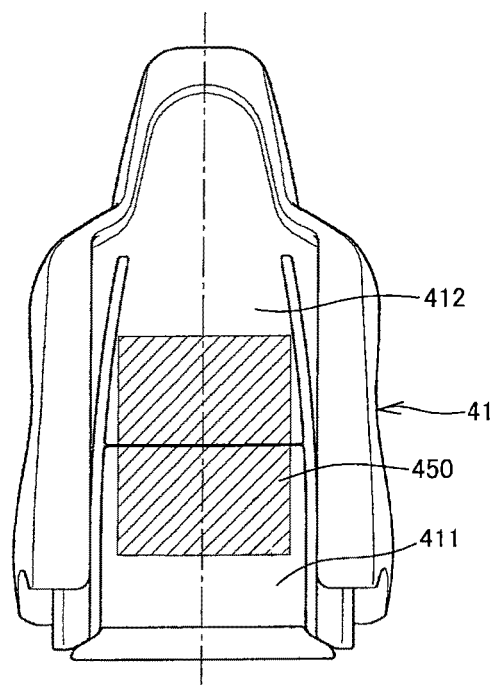
VIEW A
FIG. 25B

VIEW B

FIG. 27B

VIEW A

VEHICLE SEAT

TECHNICAL FIELD

The present invention relates to a vehicle seat, and particularly relates to a vehicle seat suitable for seats to be mounted in a sports type automobile.

BACKGROUND ART

A seat cushion part of a vehicle seat has a pair of left and right side frames, and is structured such that a cushion frame in which plural beams are bridged across the pair of side frames is used, and a pad member of an urethane foam or the like is supported on the cushion frame. In order to give predetermined stiffness to the cushion frame to enhance its energy absorbing function, not only beams are bridged across front portions and rear portions of the pair of side frames, but also plural beams are bridged across them below buttocks around a lower side of a hip point (hip joint point of a human body model used for determining a design reference) where a large load in particular is liable to be applied, to thereby support an occupant's weight.

PRIOR ART DOCUMENT

Patent Document

Patent Document 1: Japanese Patent Application Laid-open No. 2012-218456

DISCLOSURE OF THE INVENTION

Problems to be Solved by the Invention

On the other hand, in a sports type automobile, a ceiling height is set low, and hence the hip point of seats is set low (see Patent Document 1). Therefore, in seats employed for the sports type automobile, when beams supporting lower sides of buttocks are disposed as in ordinary seats (for example, seats mounted in sedan type automobiles), the hip point becomes high and hence a different device for enhancing the energy absorbing function is necessary.

The present invention has been made in view of the above, and it is an object thereof to provide a vehicle seat allowing setting a hip point low, meanwhile having high stiffness and being capable of exhibiting a sufficient energy absorbing function, and suitable for seats of sports type automobiles.

Means for Solving the Problems

In order to solve the above problems, a vehicle seat of the present invention is a vehicle seat including a seat cushion part and a seat back part, wherein the seat cushion part includes a cushion frame supporting a seat cushion part cushion member, an energy absorbing structure part is disposed inside left and right side frames constituting the cushion frame, and the energy absorbing structure part is a frame body in a substantially square shape in plan view, the frame body including: a pair of left and right stringers supported on upper rails of sliders provided on left and right sides, respectively, and each disposed along a forward and backward direction inside the side frames; and a front beam and a rear beam bridged across front portions and rear portions, respectively, of the pair of stringers, belt anchor attaching members are each provided between a coupling position to a vicinity of a rear portion of the upper rails and a coupling position of the rear beam in one of the stringers, and the vehicle seat is structured such that a deformation of the stringers accompanying an upward displacement of the belt anchor attaching members by an impact force of a predetermined value or higher absorbs the impact force, the deformation of the stringers forms a truss which couples a disposed position of the belt anchor attaching members, a coupling position of the front beam, and the coupling position to the vicinity of the rear portion of the upper rails, and this truss further resists the impact force at least temporarily.

Preferably, the pair of left and right stringers is disposed along the forward and backward direction between the upper rails of the sliders and the side frames, the vehicle seat has a pair of left and right sub-stringers, disposed inside the respective upper rails of the sliders along the forward and backward direction at positions corresponding to at least vicinities of front portions and vicinities of rear portions of the stringers, and coupled to vicinities of the front portions and vicinities of the rear portions of the upper rails, the front beam and the rear beam are bridged across the front portions and the rear portions, respectively, of the pair of stringers by penetrating through the sub-stringers, and the belt anchor attaching members are each disposed by penetration to form a two-position support structure across one of the stringers and one of the sub-stringers which oppose via one of the upper rails between a coupling position to a vicinity of a rear portion of the upper rails and a coupling position of the rear beam in the sub-stringers.

Preferably, the pair of left and right sub-stringers has front sub-stringers and rear sub-stringers, the front sub-stringers are coupled to the vicinities of the front portions of the upper rails and coupled to the front beam, the rear sub-stringers are coupled to the vicinities of the rear portions of the upper rails and coupled to the rear beam, and the belt anchor attaching members are each disposed between the coupling position to the vicinity of the rear portion of the upper rails and the coupling position of the rear beam and bridged across one of the stringers and one of the rear sub-stringers.

Preferably, the belt anchor attaching members are each bridged across three members which are one of the side frames, one of the stringers and one of the rear sub-stringers.

Preferably, the stringers are structured to also deform in a width direction, in addition to an upward deformation.

Preferably, the vehicle seat further includes an intermediate beam bridged in a width direction between the front beam and the rear beam and supporting the cushion member, wherein the intermediate beam is disposed with an offset below disposed positions of both the front beam and the rear beam.

Preferably, the front beam is constituted of a plurality of beams including at least a first front beam disposed foremost, a second front beam disposed between the first front beam and the intermediate beam, a third front beam penetrating the front sub-stringers and coupled to the vicinities of the front portions of the upper rails of the sliders between the first front beam and the second front beam.

Preferably, the seat cushion part cushion member is structured to have a pad member and an outer layer member covering the pad member, the pad member has a front pad member located on a front side of a boundary being any point in a range of 100 mm forward and backward from immediately below a hip point of a human body model used for determining a design reference, and a rear pad member located on a rear side of the boundary, the intermediate beam is provided in a range located below the front pad member, and the seat cushion part cushion member is structured such that, during seating, in the front pad member a rear side adjacent portion thereof displaces downward while rotating with the second front beam being a fulcrum until abutting the intermediate beam, in the rear pad member a front side adjacent portion thereof displaces downward while rotating with the rear beam being a fulcrum, and reaction forces thereof apply support pressure from forward and backward directions to a pelvis corresponding part of a seated person.

Preferably, side pad members are provided integrally on both side portions of the rear pad member, and the side pad members are structured to be supported on the side frames, respectively.

Preferably, the second front beam is provided in a range of 120 to 180 mm on a front side relative to the hip point by distance on a straight line coupling the hip point and a knee point.

Preferably, the front pad member in a range of 20 to 80 mm forward and backward with the second front beam being a center is provided with a stiff member increasing stiffness more than other portions.

Preferably, on rear surface sides of the front pad member and the rear pad member, there is disposed a displacement amount restricting fabric foamed integrally across the pad members and restricting displacement amounts of the rear side adjacent portion of the front pad member and the front side adjacent portion of the rear pad member.

Preferably, a seat back part cushion member supported by a back frame of the seat back part is structured to have a pad member and an outer layer member covering the pad member, the pad member has a lower pad member located below a boundary being any point in a range of 250 to 350 mm from a hip point along a torso line of a human body model used for determining a design reference and an upper pad member located above the boundary, and the seat back part cushion member is structured such that, during seating, in the front lower pad member an upper side adjacent portion thereof displaces rearward while rotating with a lower frame of the back frame being a fulcrum, in the upper pad member a lower side adjacent portion thereof displaces rearward while rotating with an upper frame of the back frame being a fulcrum, and reaction forces thereof apply support pressure along a curve from lumbar vertebrae to thoracic vertebrae of a seated person.

Preferably, on rear surface sides of the lower pad member and the upper pad member, there is disposed a displacement amount restricting fabric foamed integrally across the pad members and restricting displacement amounts of the upper side adjacent portion of the lower pad member and the lower side adjacent portion of the upper pad member.

Preferably, a lumbar support mechanism can be provided between both side frames disposed on left and right sides of the back frame of the seat back part, and as the lumbar support mechanism, one constituted of a band-shaped lumber support member having a band-shaped rubber with a predetermined length and a band-shaped fabric covering at least a front side of the rubber and stretched between the both side frames is used. In this case, more preferably, the band-shaped fabric constituting the band-shaped lumber support member is constituted of a three-dimensional knitted fabric, and is integrated with the band-shaped rubber by sewing.

Preferably, the pair of stringers constituting the energy absorbing structure part of the cushion frame is coupled to upper rails of sliders disposed in a pair on left and right sides, and a hip point of a human body model used for determining a design reference is designed in a range of 100 to 200 mm from a bottom surface of lower rails of the sliders.

Preferably, all of lower rails and upper rails constituting the sliders are formed of a thin plate having a predetermined elasticity, and are structured such that shapes of the lower rails and the upper rails change so that a section modulus in a vertical direction increases by input of an impact force of a predetermined value or higher, to thereby absorb the impact force.

Preferably, at least one of the third front beam and the rear beam is constituted of a torsion bar, and the vehicle seat further includes a flat support member elastically supported via the torsion bar.

Effect of the Invention

In a vehicle seat of the present invention, an energy absorbing structure part provided in a cushion frame is constituted of a substantially square frame body including a front beam and a rear beam, and stringers bridged across them and provided separately from side frames, and it is structured such that belt anchor attaching members are each provided between a coupling position to a vicinity of a rear portion of upper rails of sliders and a coupling position of the rear beam in the stringers. Therefore, when an impact force of a predetermined value or higher is applied, the belt anchor attaching members are energized by a seat belt by force of a human body lunging forward and thereby displace at least upward, and the stringers during this deform to absorb the impact force. On the other hand, when the impact force is applied, while the stringers deform as described above, positions where the belt anchor attaching members are disposed rise. Thus, a truss is newly formed which connects disposed positions when this displacement occurs, a coupling position of the front beam, and a coupling position to a vicinity of a rear portion of the upper rails of the sliders. Then, this truss structure functions as a new structure having predetermined stiffness, and this time a further impact force which continues to be applied is sustained by this truss structure, thereby absorbing the impact force.

Therefore, in the position corresponding to the hip point in a substantially square frame body, predetermined stiffness can be exhibited and impact energy can be absorbed without bridging, at a disposition height of the stringers similarly to the front beam and the rear beam, a beam to be bridged in a width direction. Accordingly, it becomes possible to set the hip point low, which is suitable for vehicle seats of sports type automobiles.

BRIEF DESCRIPTION OF DRAWINGS

FIG. 25A is a perspective view illustrating a pad member of a vehicle seat according to still another embodiment of the present invention, FIG. 25B is a view of arrow A in FIG. 25A, FIG. 25C is a view of arrow B in FIG. 25A.

FIG. 27A is a perspective view illustrating a pad member of a vehicle seat for explaining a mode in which an area of a displacement amount restricting fabric is larger than that in the mode illustrated in FIG. 25 FIGS. 25A, 25B, FIG. 27B is a view of arrow A in FIG. 27A, and FIG. 27C is a view of arrow B in FIG. 27A.

EMBODIMENT FOR CARRYING OUT THE INVENTION

Figure 1:
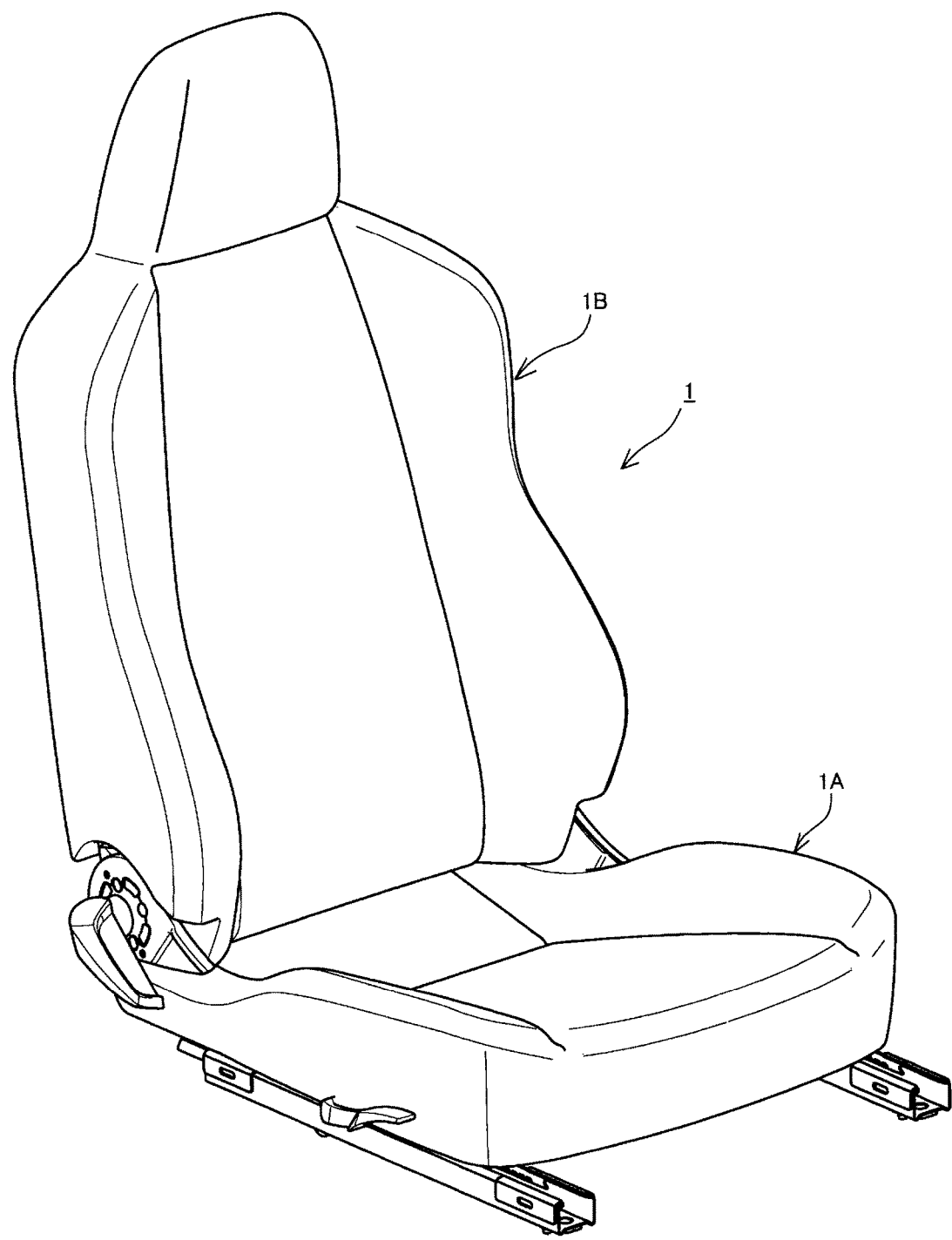
FIG. 1 is a perspective view illustrating an appearance of a vehicle seat according to one embodiment of the present invention seen from an oblique left front side.
Figure 2:
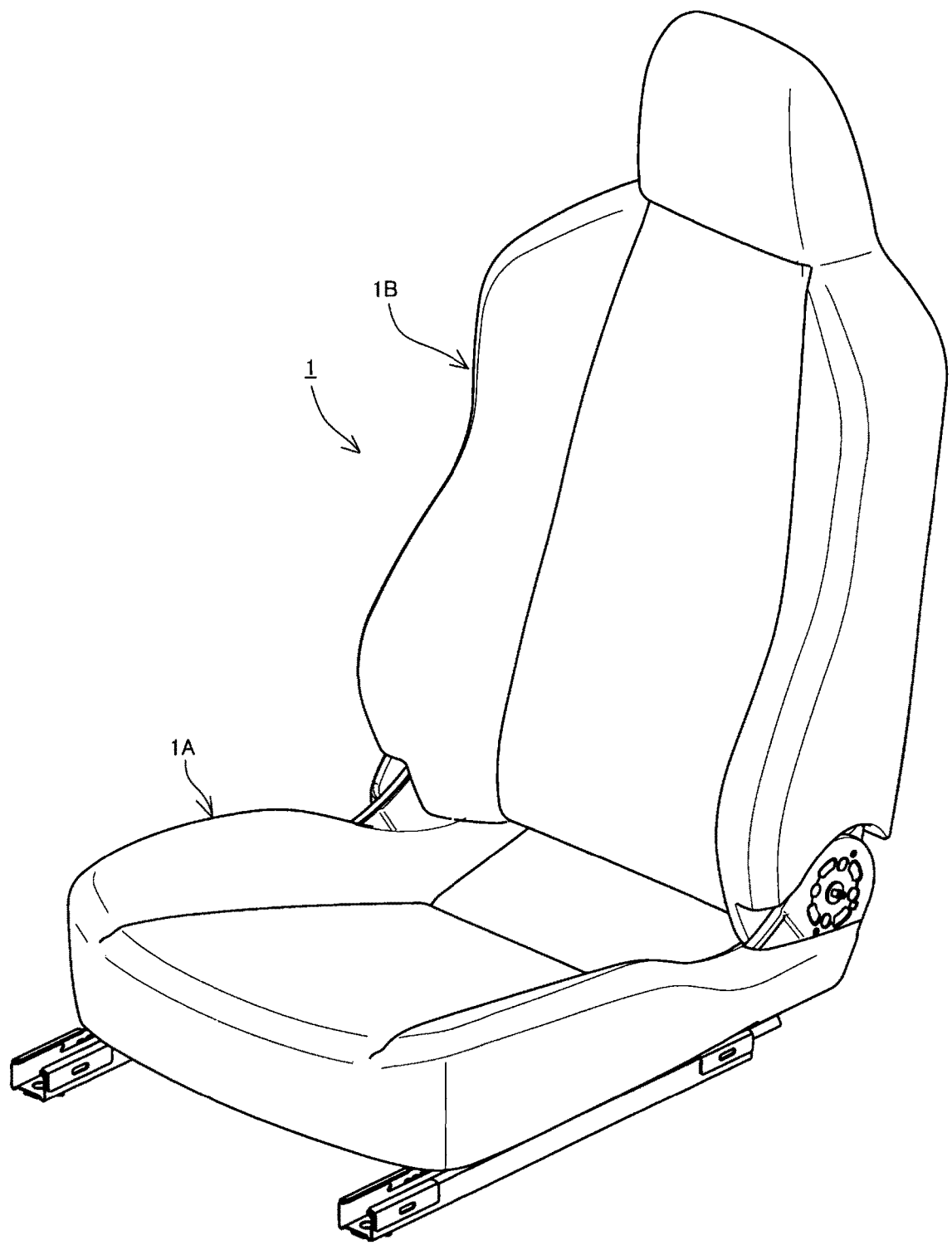
FIG. 2 is a perspective view illustrating an appearance of the vehicle seat according to the embodiment seen from an oblique right front side.
Figure 3:
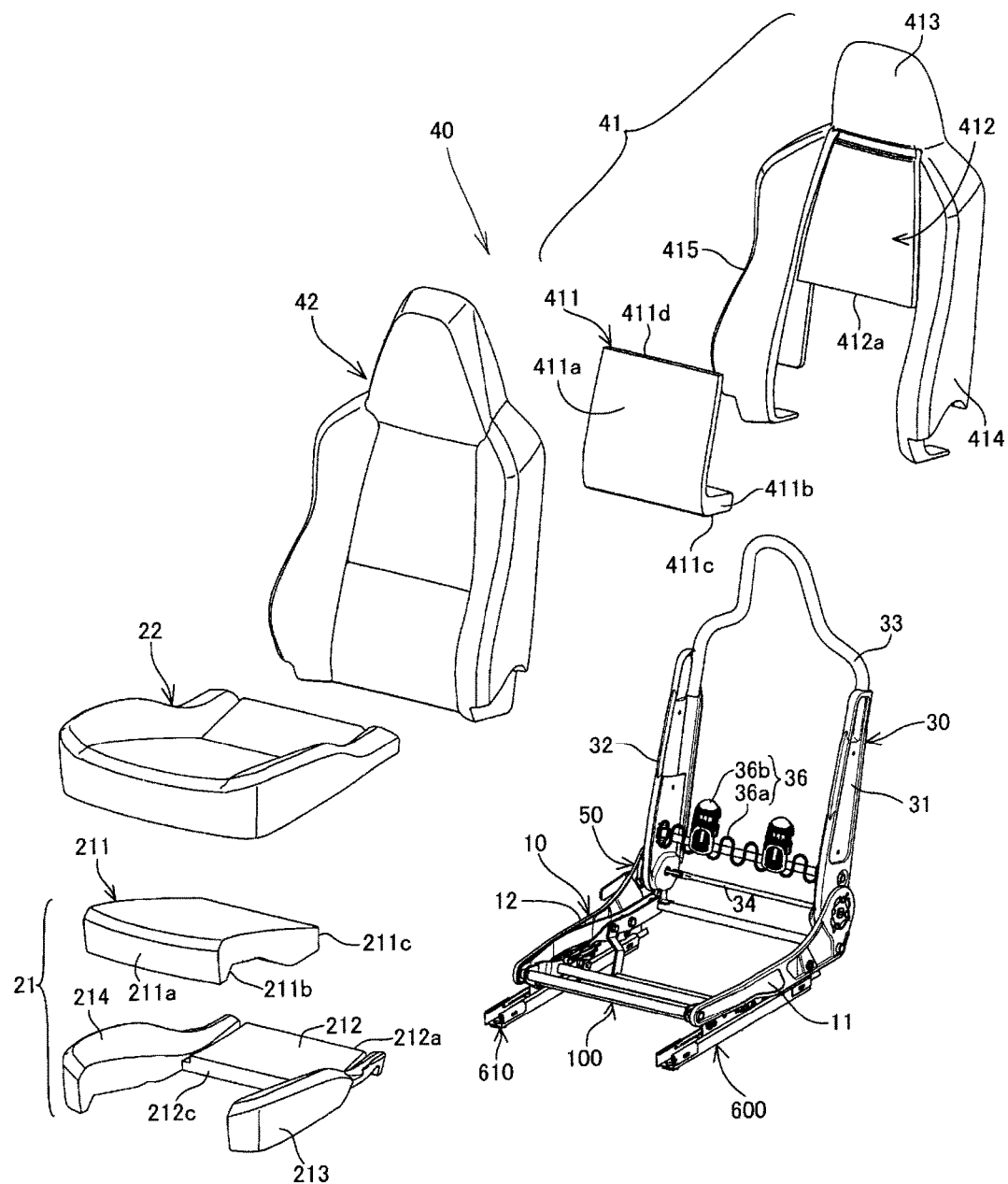
FIG. 3 is an exploded perspective view of the vehicle seat according to the embodiment.
Figure 4:
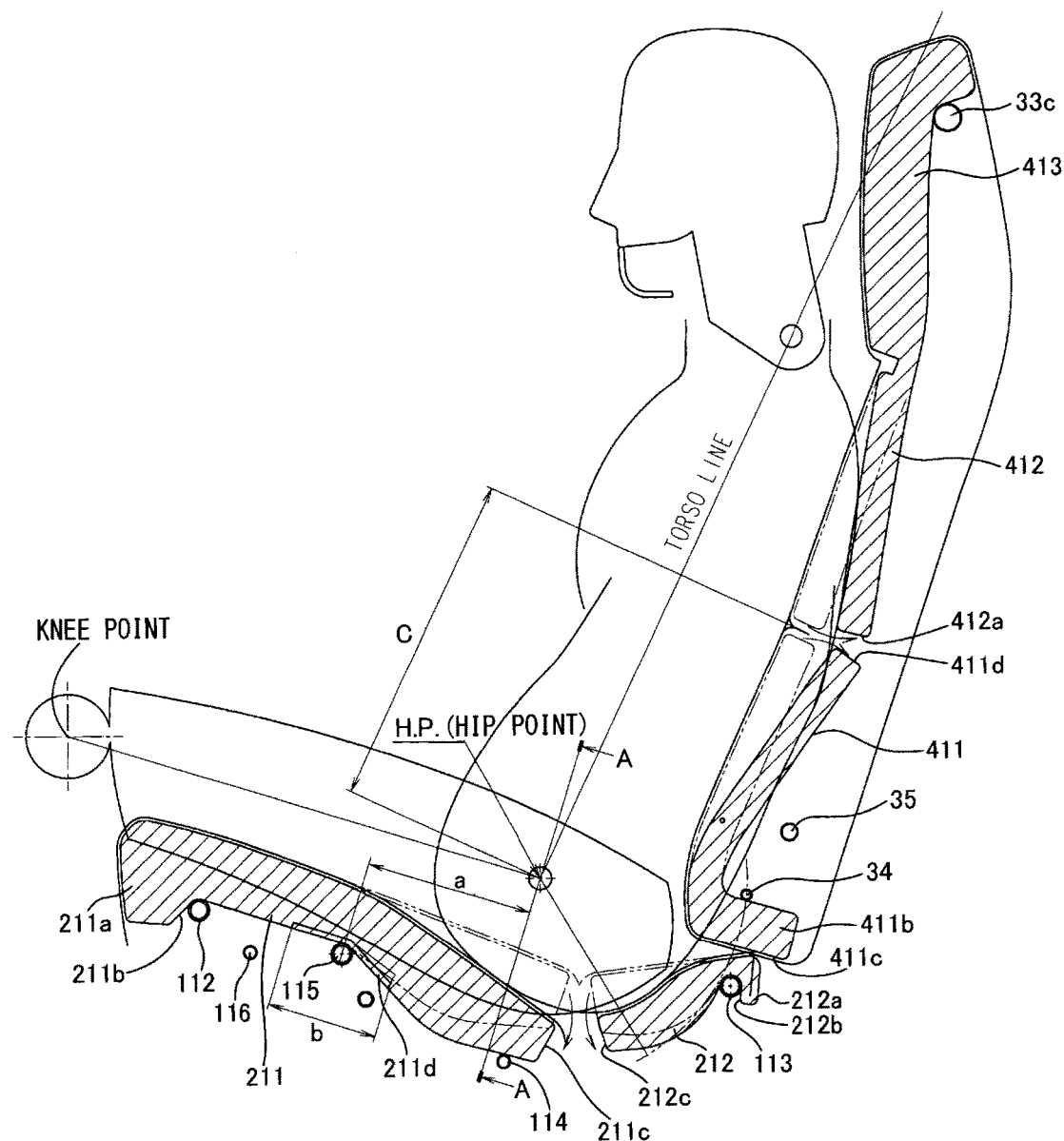
FIG. 4 is a center cross-sectional view of the vehicle seat according to the embodiment.

Hereinafter, the present invention will be described in further detail based on an embodiment illustrated in the drawings. FIG. 1 and FIG. 2 are views illustrating an appearance of a vehicle seat 1 according to one embodiment of the present invention, FIG. 3 is an exploded perspective view thereof, and FIG. 4 is a center cross-sectional view.

A vehicle seat 1 of this embodiment has a cushion frame 10 forming a seat cushion part 1A and a back frame 30 forming a seat back part 1B, and they are coupled via a reclining mechanism 50.

The cushion frame 10 is constituted having left and right side frames 11, 12 and an energy absorbing structure part 100 as illustrated in FIG. 3 and FIG. 6 to FIG. 10. The left and right side frames 11, 12 are, in this embodiment, constituted of a metal plate body extending from a front edge portion of the vehicle seat 1 to a lower portion of the back frame 30, for which preferably a thin plate having a thickness of 0.5 to 1.2 mm is used for weight reduction. In the vehicle seat 1 of this embodiment, in order to be suitable for seats of sports type automobiles, a height (symbol H1 in FIG. 5) of a hip point to be a design reference position (a hip point (H. P.) of a human body model used when determining a design reference (for example, a 50th percentile human body model of an adult male prescribed in JIS D 4607 or ISO6549)) is set low. Preferably, the height (height from a bottom surface of lower rails 602, 612 of sliders 600, 610) H1 of the hip point is set in the range of 100 to 200 mm. Depending on the height in a vertical direction of the side frames 11, 12, the height H1 of the hip point cannot be set in the above range. Thus, the height in the vertical direction of the side frames 11, 12 (width (symbol H2 in FIG. 5) of the plate body) excluding a portion in which a reclining mechanism 50 is disposed is in the range of 20 to 100 mm, and is preferred to be less than a height H1 of the hip point.

The energy absorbing structure part 100 is disposed inside the left and right side frames 11, 12, and is structured to have a pair of stringers 110, 111, a front beam, a rear beam 113, an intermediate beam 114, and so on. Note that in this embodiment, the front beam is constituted of a group of three beams of a first front beam 112, a second front beam 115, and a third front beam 116.

The pair of stringers 110, 111 is disposed along a forward and backward direction inside the side frames 11, 12. Each stringer 110, 111 is formed of a metal plate having a thickness of 0.8 to 4.0 mm, which is thicker and higher in stiffness than the side frames 11, 12.

The first front beam 112 is bridged across front portions of the pair of stringers 110, 111, and the rear beam 113 is bridged across rear portions of the pair of stringers 110, 111, both the beams being constituted of a pipe member.

In vicinities of the front portions of the pair of stringers 110, 111, there are disposed front sub-stringers 1101, 1111 located inside the stringers 110, 111, having a length of about ¼ to ⅙ of the stringers 110, 111, and having a substantially triangular shape with a part projecting downward. Between the front sub-stringers 1101, 1111 and the stringers 110, 111, an interval in which upper rails 601, 611 of sliders 600, 610 provided on the left and right sides can be positioned is provided, and the first front beam 112 is provided to penetrate through the front sub-stringer 1101 and the stringer 110 on one side, and penetrate through the front sub-stringer 1111 and the stringer 111 on the other side. Therefore, vicinities of respective ends of the first front beam 112 are supported at two separate positions by the front sub-stringer 1101 and the stringer 110 as well as the front sub-stringer 1111 and the stringer 111.

The front sub-stringers 1101, 1111 in a substantially triangular shape have first through holes 1101a, 1111a which are provided in vicinities of respective front ends and through which the above-described first front beam 112 penetrate, second through holes 1101b, 1111b provided in vicinities of respective rear ends, and third through holes 1101c, 1111c provided in a portion which is intermediate between them and projecting downward. Then, the third front beam 116 is bridged so that its ends penetrate through the opposing third through holes 1101c, 1111c, respectively, of the left and right front stringers 1101, 1111, and the ends of the third front beam 116 are coupled and fixed to the upper rails 601, 611 of the sliders 600, 610. Thus, the pair of stringers 110, 111 is coupled and supported by front attachment holes 601a, 611a of the respective upper rails 601, 611 via the front sub-stringers 1101, 1111. Further, across the opposing second through holes 1101b, 1111b of the left and right front stringers 1101, 1111, the second front beam 115 for maintaining an interval therebetween and enhancing stiffness is bridged. Therefore, across the front sub-stringers 1101, 1111, front beams 112, 115, 116 constituted of a group of three beams are bridged, thereby forming a three-dimensional truss. This three-dimensional truss enhances shock resistance of the vicinity of a front of the energy absorbing structure part 100.

On the other hand, in vicinities of the rear portions of the pair of stringers 110, 111, rear sub-stringers 1102, 1112 located inside the stringers 110, 111 are disposed. The rear sub-stringers 1102, 1112 extend in the forward and backward direction in substantially parallel with the stringers 110, 111, and are each formed in a substantially L shape having a first plate portion 1102a, 1112a having a length of about ¼ to ⅕ of the stringers 110, 111 and a second plate portion 1102b, 1112b extending downward from a front end of the first plate portion 1102a, 1112a.

Respective ends of the above-described rear beam 113 are disposed to penetrate through rear through holes 1102c, 1112c formed in rear portions of the pair of first plate portions 1102a, 1112a disposed to oppose each other, and respective ends of the rear beam 113 penetrate through the rear portions of the pair of stringers 110, 111. Thus, in the rear beam 113, an end on one side is supported by a two-position support structure on the rear stringer 1102 and the stringer 110, and an end on the other side is supported by a two-position support structure on the rear stringer 1112 and the stringer 111.

Corner portions of the first plate portions 1102a, 1112a and the second plate portions 1102b, 1112b are coupled to rear attachment holes 601b, 611b of the upper rails 601, 611 of the sliders 600, 610 by pin members 1102d, 1112d, and thereby the pair of stringers 110, 111 is coupled to and supported in vicinities of rear portions of the upper rails 601, 611 via the rear sub-stringers 1102, 1112.

The intermediate beam 114 constituted of a pipe member is bridged across respective opposing lower ends of the second plate portions 1102b, 1112b. Since the intermediate beam 114 is disposed in this manner between the respective lower ends of the second plate portions 1102b, 1112b extending downward, it is offset below disposed positions (disposition heights) of both the first front beam 112 and the rear beam 113. Further, the intermediate beam 114 is provided to be located in the vicinity of immediately below the above-described hip point, specifically, any point in the range of 100 mm forward and backward of immediately below the hip point. While a person is seated, the load is applied to the pad members with the hip point being a center, and thus it is provided in this range for obtaining a sense of support while seated. On the other hand, since it is necessary to make the hip point low, the intermediate beam 114 is offset below as described above. As the offset amount, preferred is a range of 50 to 150 mm in length between centers from the pin members 1102d, 1112d to the intermediate beam 114.

Note that the respective ends of the first front beam 112 and the rear beam 113 are, in this embodiment, as described above, not only supported at two separate positions by the front sub-stringers 1101, 1111 and the rear sub-stringers 1102, 1112, respectively, as well as the stringers 110, 111, but are further disposed to penetrate through front portions and rear portions of the side frames 11, 12 in a thickness direction, thereby making a structure in which stiffness of the energy absorbing structure part 100 structured as a substantially square frame body is further enhanced.

Here, between the rear beam 113 and the pin members 1102d, 1112d, belt anchor attaching members (anchor bolts) 117, 118 are disposed for fixing a belt anchor to which one end of a seat belt 15 (see FIG. 6) is coupled. The belt anchor attaching members 117, 118 are attached by penetrating three members which are the side frame 11, 12, the stringer 110, 111, and the first plate portion 1102a, 1112a of the rear sub-stringer 1102, 1112.

The cushion frame 10 supports a seat cushion part cushion member 20. The seat cushion part cushion member 20 has, as illustrated in FIG. 3 and FIG. 4, a pad member 21 and an outer layer member 22 covering the pad member 21. The pad member 21 is constituted of urethane foam or the like, and further has a front pad member 211 and a rear pad member 212.

The front pad member 211 is formed in a substantially square shape in plan view, having a width that fits between the opposing front sub-stringers 1101, 1111 and a length in the forward and backward direction from the first front beam 112 to the intermediate beam 114. A front edge portion 211a of the front pad member 211 has a shape with its lower surface expanding downward. Then, the front pad member is disposed so that a step portion 211b adjacent to the downward expanding portion of the front edge portion 211a is located on the first front beam 112, and moreover, after passing through the second front beam 115, a rear side adjacent portion 211c is located above the intermediate beam 114.

The rear pad member 212 has a shape such that a lower surface of a rear edge portion 212a expands downward, and is disposed so that a step portion 212b adjacent thereto is located above the rear beam 113. In the front pad member 211 and the rear pad member 212 in a state that no load is placed during non-seating (state of two-dot chain line in FIG. 4), a rear side adjacent portion 211c of the front pad member 211 and a front side adjacent portion 212c of the rear pad member 212 have lengths in the forward and backward direction which are set to a degree making the both in contact or set such that a gap is small if it is generated. Further, the rear side adjacent portion 211c of the front pad member 211 is set to be at any position in the range of 100 mm forward and backward of immediately below the hip point. Note that the intermediate beam 114 is provided in the range of 100 mm forward and backward of immediately below the hip point as described above, and is set in this range and in a range that a lower surface of the rear side adjacent portion 211c can be in contact when the rear side adjacent portion 211c of the front pad member 211 displaces downward.

On side surfaces of the rear pad member 212, rear portions of left and right side pad members 213, 214 are provided integrally. That is, the rear pad member 212 and the left and right side pad members 213, 214 are molded integrally to be a substantially U shape in plan view. The side pad members 213, 214 are disposed to cover the above-described pair of stringers 110, 111 (including the front sub-stringers 1101, 1111 and the rear sub-stringers 1102, 1112) and the side frames 11, 12.

Figure 5:
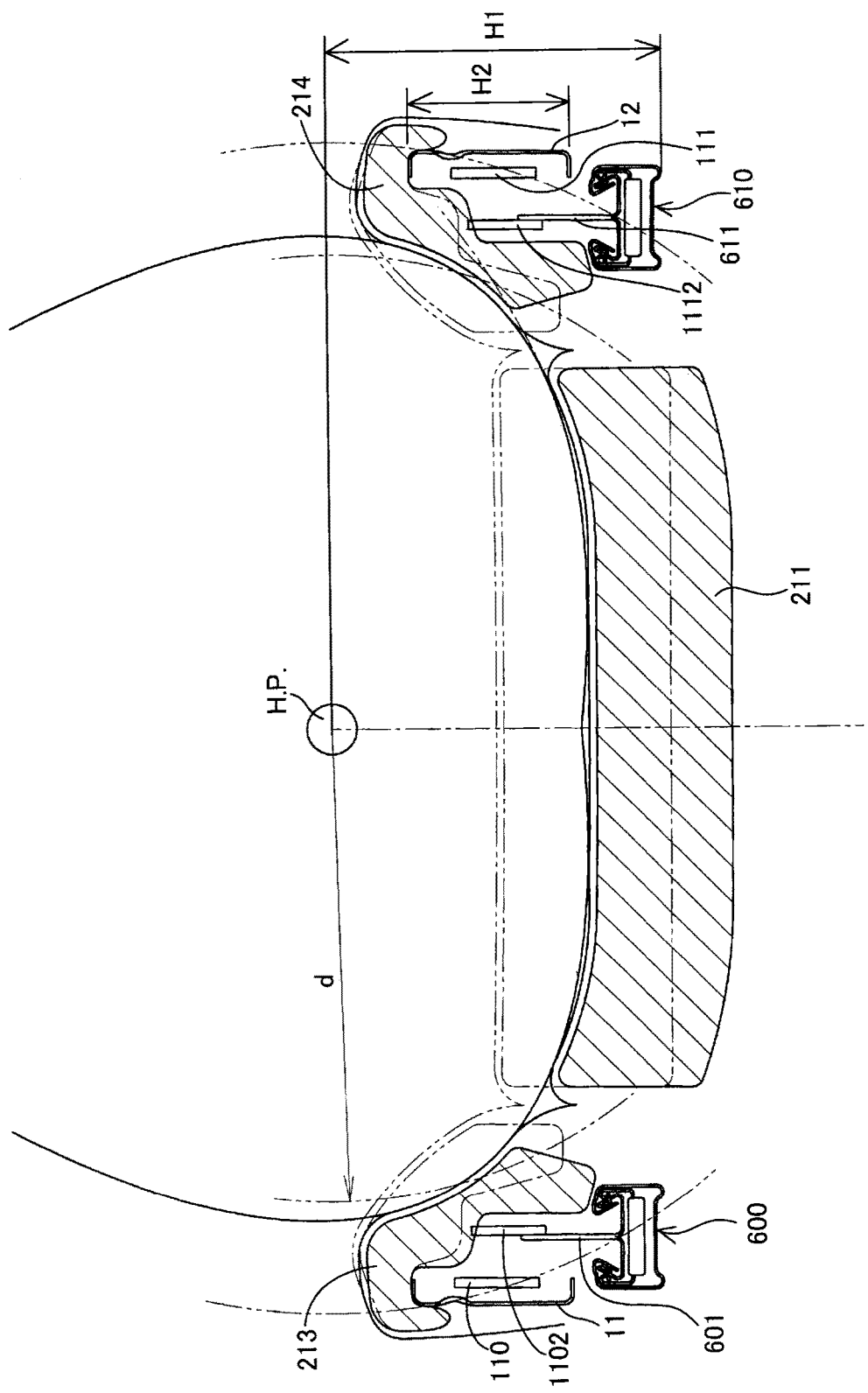
FIG. 5 is an A-A cross-sectional view of FIG. 4.
Figure 6:
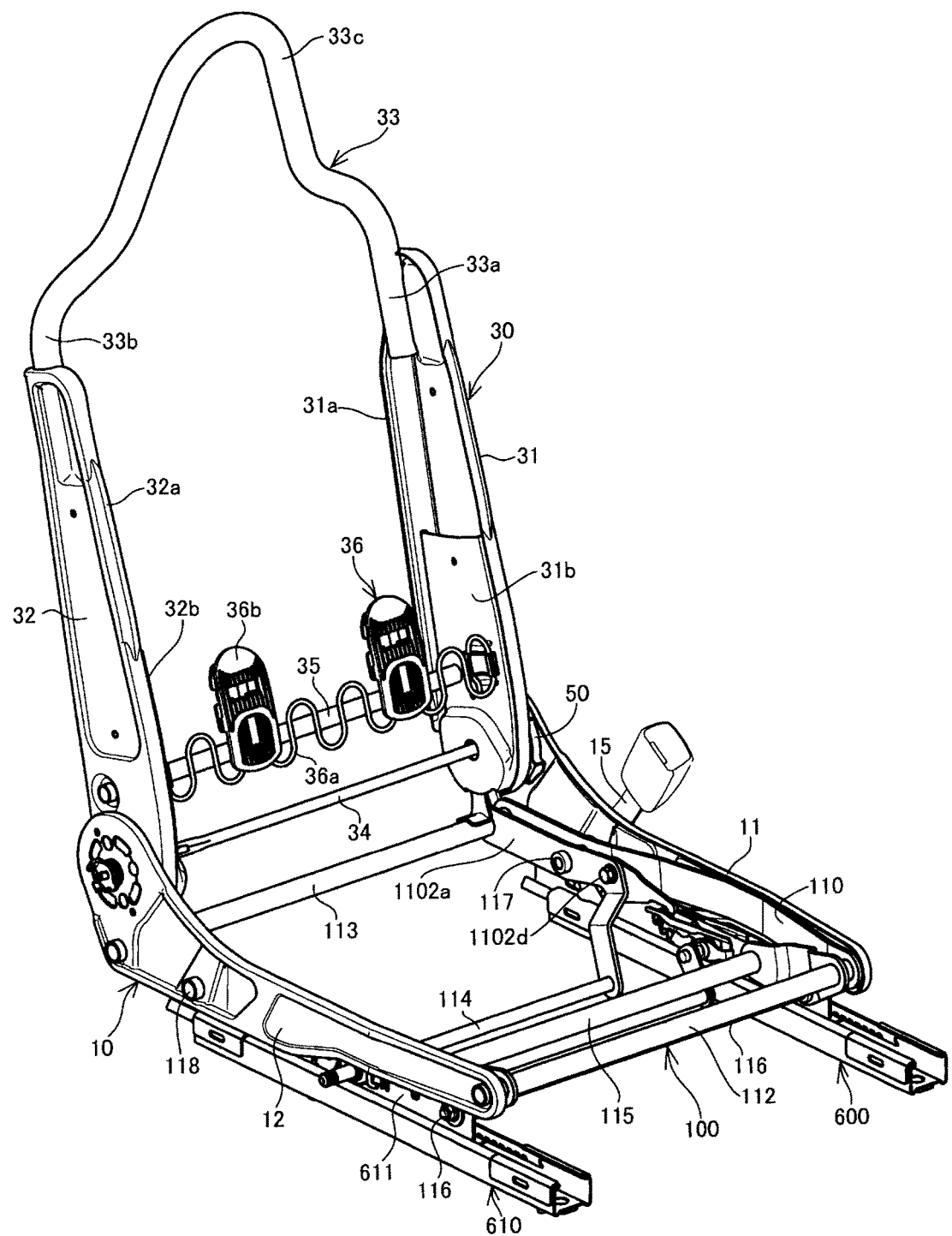
FIG. 6 is a perspective view illustrating a frame structure of the vehicle seat according to the embodiment seen from an oblique left front side.
Figure 7:
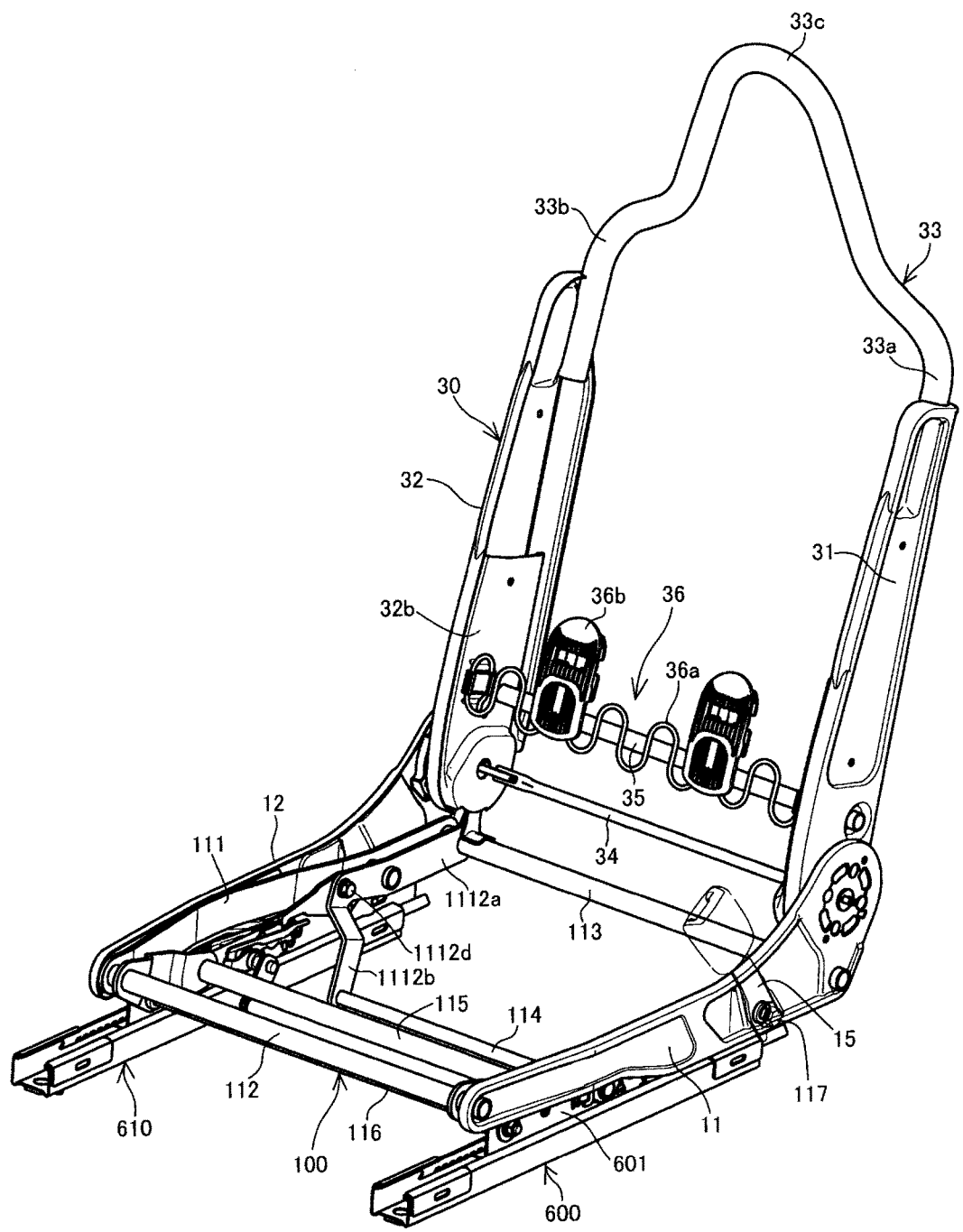
FIG. 7 is a perspective view illustrating a frame structure of the vehicle seat according to the embodiment seen from an oblique right front side.
Figure 8:
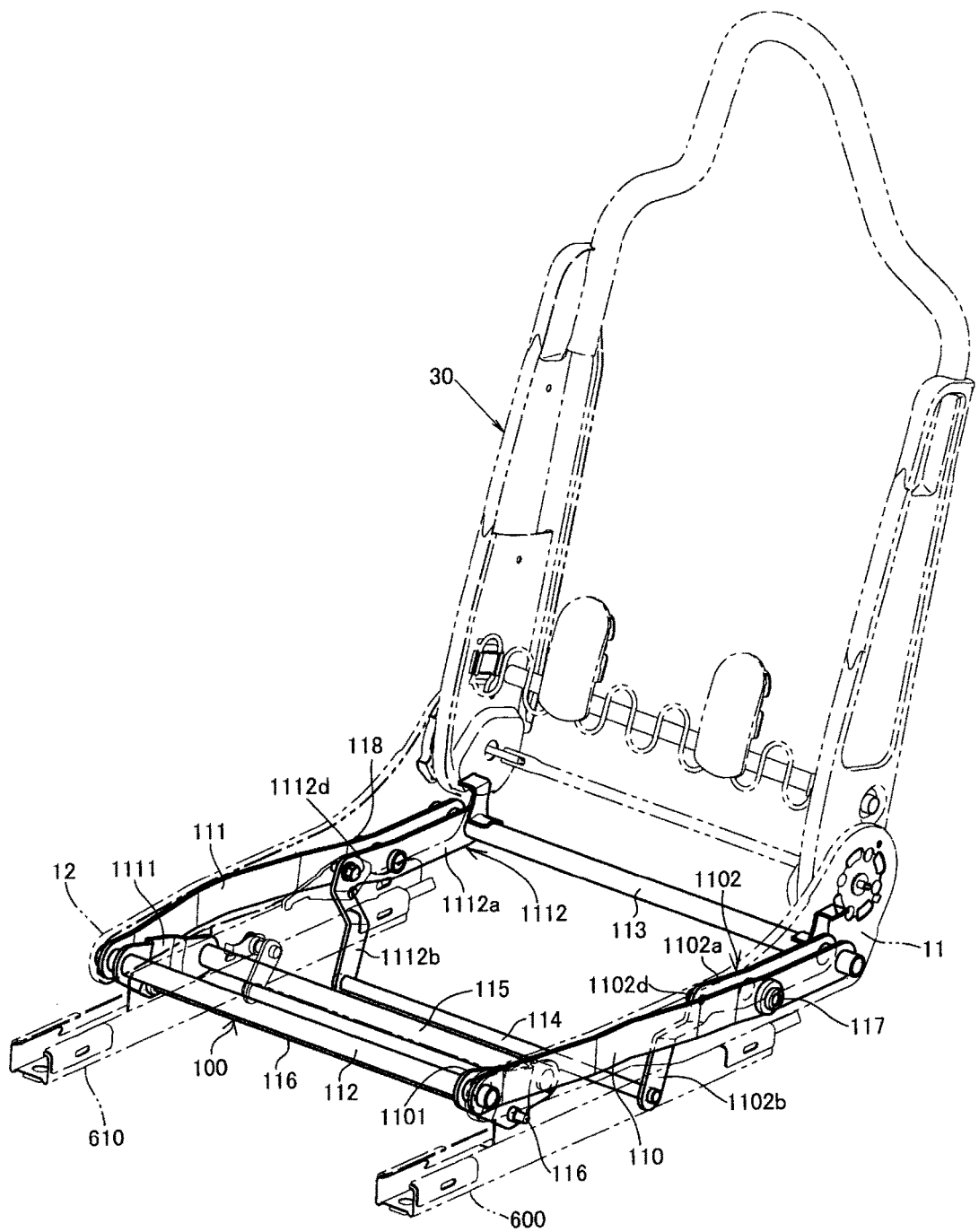
FIG. 8 is a perspective view illustrating an energy absorbing structure part used in the embodiment.
Figure 9:
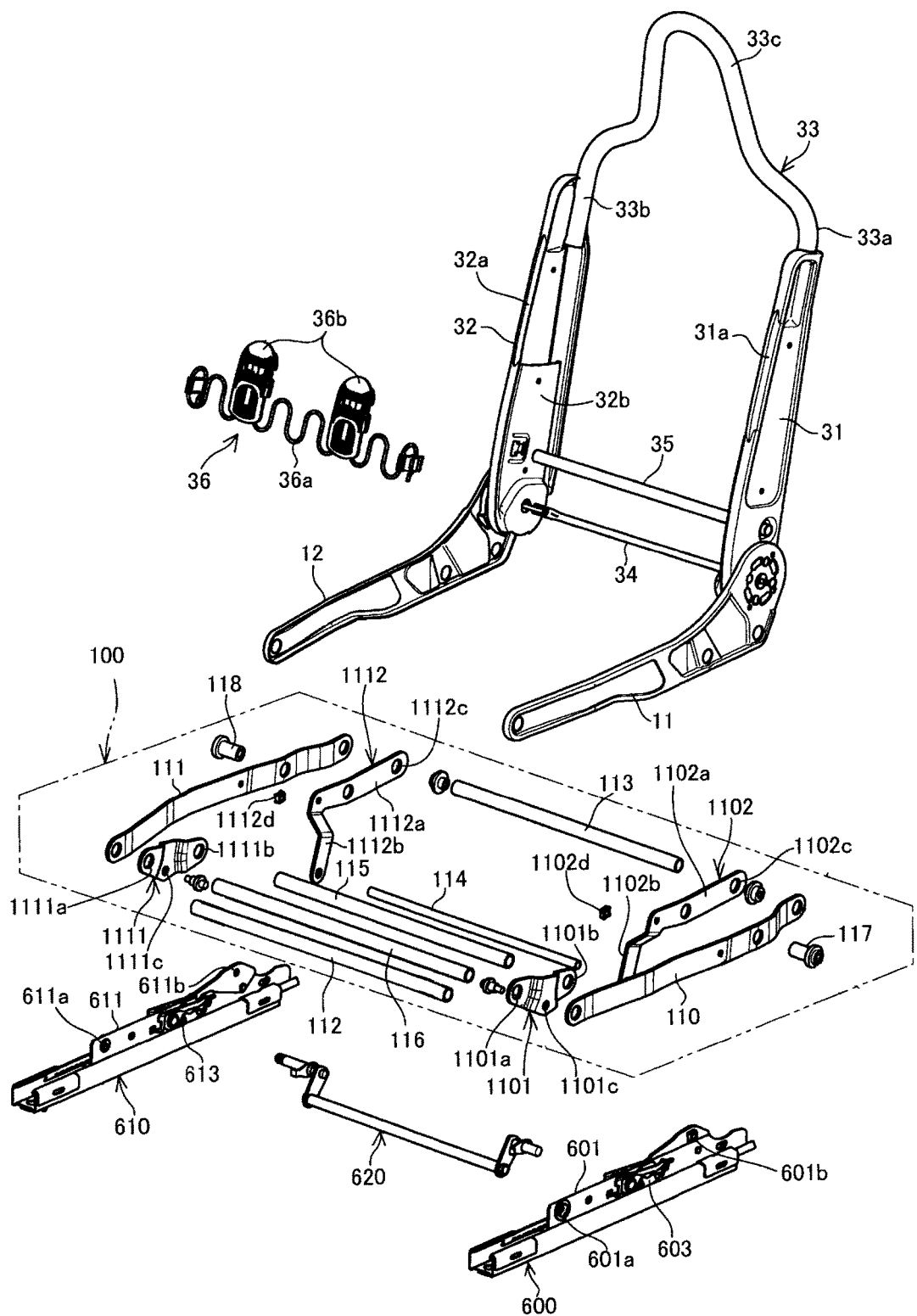
FIG. 9 is an exploded perspective view of a frame structure of the vehicle seat according to the embodiment.
Figure 10:
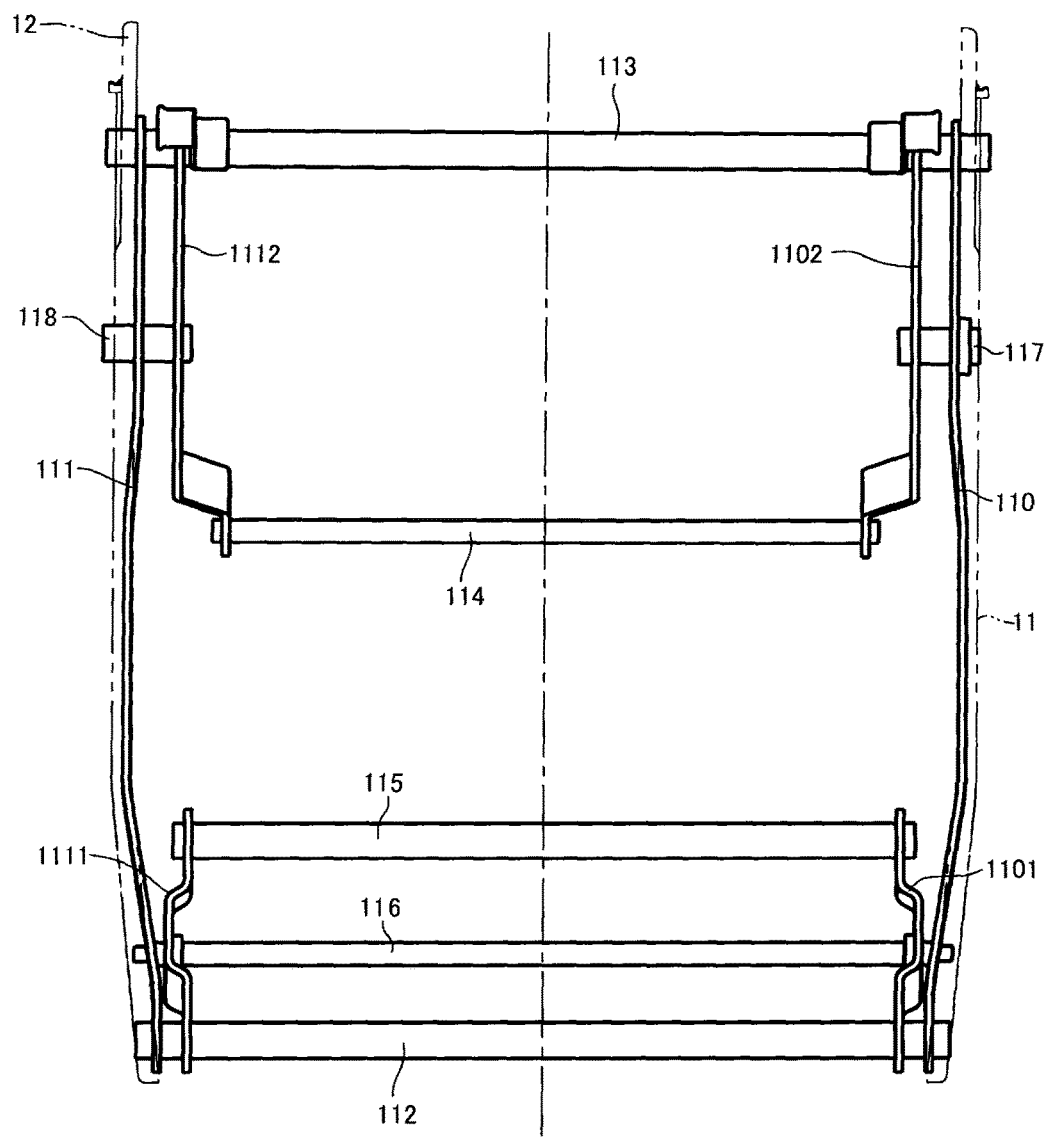
FIG. 10 is a plan view illustrating the energy absorbing structure part used in the embodiment.
Figure 11:
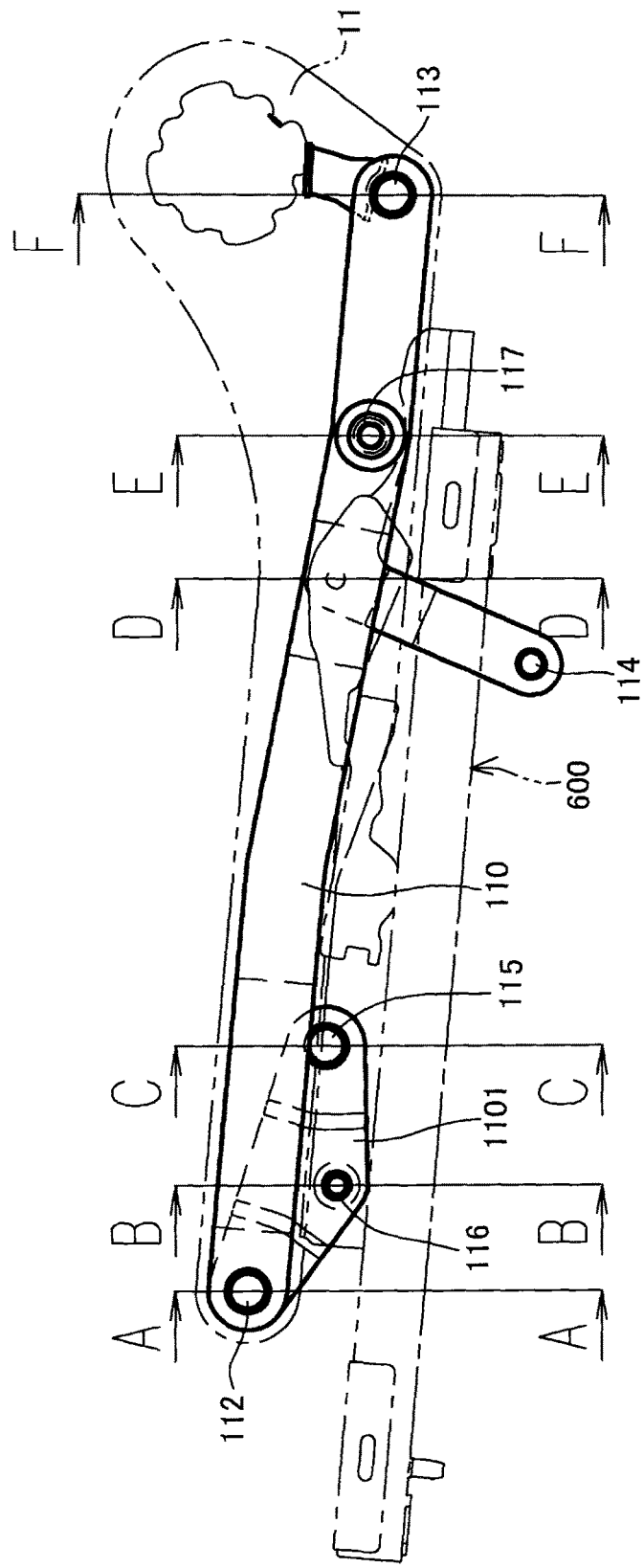
FIG. 11 is a side view of FIG. 10.
Figure 12A:
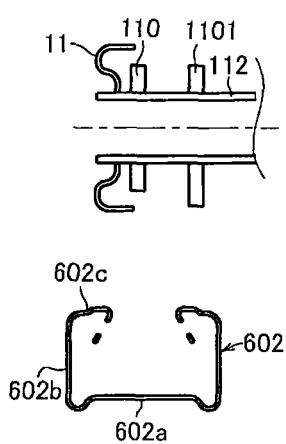
FIG. 12A is an A-A cross-sectional view of FIG. 11.
Figure 12B:
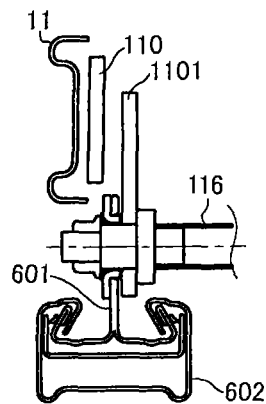
FIG. 12B is a B-B cross-sectional view of FIG. 11.
Figure 12C:
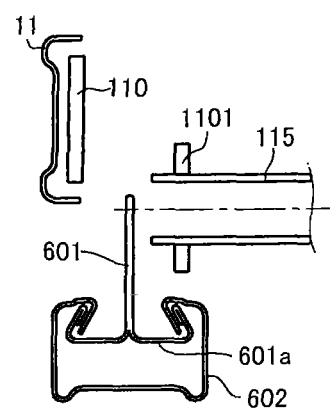
FIG. 12C is a C-C cross-sectional view of FIG. 11.
Figure 12D:
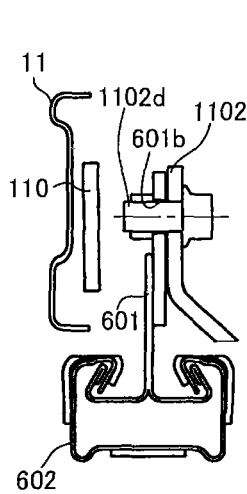
FIG. 12D is a D-D cross-sectional view of FIG. 11.
Figure 12E:
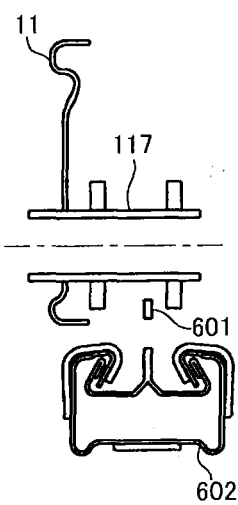
FIG. 12E is an E-E cross-sectional view of FIG. 11 and mainly illustrates an outside structure.
Figure 12F:
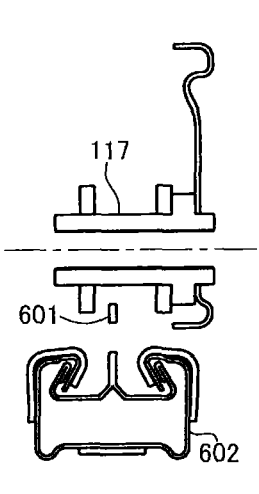
FIG. 12F is an E-E cross-sectional view of FIG. 11 and mainly illustrates an inside structure.
Figure 12G:
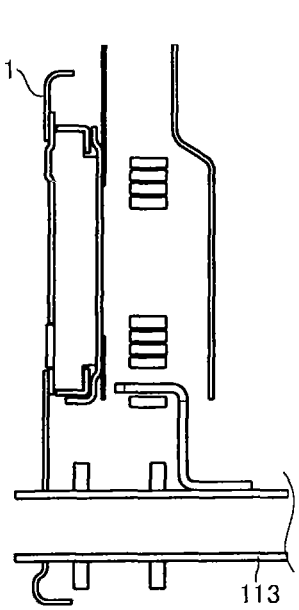
FIG. 12G is an F-F cross-sectional view of FIG. 11.

Since the front pad member 211 and the left and right side pad members 213, 214 are divided, as illustrated in FIG. 5, the left and right side pad members 213, 214 are compressed in left and right directions when a person is seated. That is, a reaction force by compression operates to the seated person from the left and right directions, but a reaction force in an obliquely upward direction does not operate as in the case where the front pad member 211 and the side pad members 213, 214 are integrated. Therefore, it is a structure in which the rear sub-stringers 1102, 1112 located obliquely below the buttocks are difficult to be felt as foreign objects. Therefore, the distance d from the hip point to each side pad member 213, 214 can be a small distance than usual, which can contribute to size reduction and weight reduction.

Note that a flat support member (not illustrated) constituted of a two-dimensional or three-dimensional knitted fabric may be stretched between the first front beam 112 and the rear beam 113, and the front pad member 211 and the rear pad member 212 may be disposed thereon. In this case, the flat support member is preferably suspended loosely so as not to hinder movement of the front pad member 211 and the rear pad member 212, which will be described later.

Further, the second front beam 115 bridged between the second through holes 1101b, 1111b provided in the vicinities of rear ends of the front sub-stringers 1101, 1111 is preferred to be provided in the range of 120 to 180 mm forward (symbol a in FIG. 4) relative to the hip point by distance on a straight line coupling the hip point and a knee point in the above-described human body model, so as to support femoral regions. Further, in order to increase the sense of support for the femoral regions, on a rear surface of the front pad member 211 in the range (symbol b in FIG. 4) of 20 to 80 mm forward and backward with the second front beam 115 being a center, it is more preferred to provide a stiff member (such as a felt) 211d which increases stiffness more than other portions of the front pad member 211 constituted of urethane foam, or the like.

The outer layer member 22 covers the pad member 21 having the front pad member 211, the rear pad member 212 and the side pad members 213, 214 from a surface side, and is then fixed.

The back frame 30 constituting the seat back part 1B has its lower portion coupled to the rear portion of the cushion frame 10 via the reclining mechanism 50.

The back frame 30 has, as illustrated in FIG. 3, FIG. 4 and FIG. 6 to FIG. 9, a pair of side frames 31, 32 disposed with a predetermined interval, an upper frame 33 located between upper portions of the side frames 31, 32, and a lower frame 34 disposed between lower portions of the side frames 31, 32.

The side frames 31, 32 have a structure employing a thin plate member and having inward flanges 31a, 32a, and in the vicinity of a lower portion, plate members 31b, 32b are attached inside, and the reclining mechanism 50 is disposed in a space formed by them.

The upper frame 33 has both side portions 33a, 33b coupled to the side frames 31, 32, and in its intermediate portion, a head rest support portion 33c bent to expand upward is provided integrally.

The lower frame 34 is disposed between lower portions of the side frames 31, 32, but in this embodiment, a rotation axis of the reclining mechanism 50 is used also as the lower frame 34. Further, slightly above the lower frame 34, a reinforcing frame 35 for retaining an interval between the side frames 31, 32 so as to keep the shape is bridged between them. A spring member 36a bridged across the both side frames 31, 32 is disposed in front of the reinforcing frame 35, and two support plates 36b are attached with a predetermined interval on this spring member 36a, thereby forming a lumbar support mechanism 36.

A seat back part cushion member 40 supported by the back frame 30 has a pad member 41 and an outer layer member 42 covering the pad member 41. The pad member 41 is constituted of urethane foam or the like, and further has a lower pad member 411 and an upper pad member 412.

The lower pad member 411 is formed with a substantially L-shaped cross section having a support surface part 411a supporting the back of a person and a projecting part 411b projecting rearward from a lower portion of the support surface part 411a, and is disposed so as to cover a front surface of the lumbar support mechanism 36 of the support surface part 411a by inserting the projecting part 411b in between the lower frame 34 and the rear pad member 212 (see FIG. 4). Therefore, the lower pad member 411 is elastically supported by a spring member 36a of the lumbar support mechanism 36. Further, the lower pad member 411 has a width that fits between the opposing side frames 31, 32 and a predetermined length in an upward and downward direction. Preferably, the length in the upward and downward direction of the support surface part 411b (length from a lower end surface 411c to an upper side adjacent portion 411d (symbol c in FIG. 4)) is set in the range of 250 to 350 mm from the hip point along a torso line of a human body model used for determining a design reference described above.

The upper pad member 412 is formed integrally with a head rest pad member 413 forming the head rest part in this embodiment as illustrated in FIG. 3 and FIG. 4, and is disposed by engaging the head rest pad member 413 with the head rest support portion 33c of the upper frame 33. The upper pad member 412 in a state that a person is not seated (state of two-dot chain line in FIG. 4) is set to have a length in the upward and downward direction to a degree that a lower side adjacent portion 412a contacts the upper side adjacent portion 411d of the lower pad member 411, or that a slight gap is generated between the both. In the head rest pad member 413, side pad members 414, 415 are further formed integrally, and is, as described above, disposed to cover the head rest support portion 33c by the head rest pad member 413, and cover outer surfaces of the side frames 31, 32 by the side pad members 414, 415.

Then, the outer layer member 42 is disposed to cover the upper pad member 412, the head rest pad member 413 and the side pad members 414, 415.

Here, the sliders 600, 610 supporting the above-described cushion frame 10 have lower rails 602, 612 in a substantially U-shaped cross section, and upper rails 601, 611 in a substantially reverse T shape are disposed slidably in the lower rails 602, 612 (see FIG. 12A to 12G). Then, by lock mechanisms 603, 613, the upper rails 601, 611 can be fixed to arbitrary positions with respect to the lower rails 602, 612. In this embodiment, the lock mechanisms 603, 613 are provided on both the left and right sliders 600, 601, so that forces are distributed to the left and right sides in a balanced manner. Since the lock mechanisms 603, 613 are provided on the left and right sides, in order to release them in synchronization, a release rod 620 which can operate and release the both is bridged across the lock mechanisms 603, 613, and a lock can be released by operating the release rod 620.

The lower rails 602, 612 and the upper rails 601, 611 are both formed of a metal thin plate having a predetermined elasticity. Accordingly, by an impact force of a predetermined value or higher, the lower rails 602, 612 deform such that corner portions of bottom wall parts 602a, 612a and side wall parts 602b, 612b having a substantially U-shaped cross section as well as corner portions of the side wall parts 602b, 612b and upper wall parts 602c, 612c extend in a vertical direction, and moreover deform such that horizontal wall parts 601a, 611a in a substantially reverse T shape of the upper rails 601, 611 change from horizontal to vertical, that is, a vertical section modulus increases. By this deformation, a shock resistance can be absorbed.

According to a vehicle seat 1 of this embodiment, when a person sits down, in the seat cushion part 1A, a load is applied downward from around an ischial tuberosity. At this time, the rear side adjacent portion 211c of the front pad member 211 displaces in a direction rotating downward with the second front beam 115 being a fulcrum, and displaces, in the case of maximum displacement, a lower surface in the vicinity of the rear side adjacent portion 211c abuts on the intermediate beam 114 which is offset below the disposed positions of the first front beam 112 and the rear beam 113. Further, the front side adjacent portion 212c of the rear pad member 212 also displaces in a direction rotating downward with the rear beam 113 being a fulcrum (state illustrated by solid lines in FIG. 4). Accordingly, during seating, reaction forces of the front pad member 211 and the rear pad member 212 support the pelvis corresponding part of the seated person by pressing in a wedge shape from the front and back. Further, the front pad member 211 rotates with the second front beam 115 provided in the range of 120 to 180 mm forward on a front side relative to the hip point being a fulcrum, and the stiff member 211d is provided in the range of 20 to 80 mm of this portion, as described above. Accordingly, femoral regions are supported securely, and backward shifting of the pelvis corresponding part of the seated person is suppressed, which excel in posture supportability. When the disposed position of the second front beam 115 being the fulcrum of deformation of the front pad member 211 deviates from the above-described range and is closer to the hip point, feeling of pressure is easily felt, or when it is separated more than the above-described range, feeling of support becomes poor.

Further, during seating, the intermediate beam 114 located in the vicinity of under buttocks is offset below as described above. Accordingly, it is a structure such that a predetermined stroke feeling can be obtained by movement of the above-described front pad member 211 and the rear pad member 212 even when the hip point is equal to or lower than a predetermined height, and is preferable as a vehicle seat of sports type which is required to have a low hip point.

On the other hand, in the seat back part 1B, the support surface part 411a of the lower pad member 411 supports the vicinity of a lumber region of the seated person by elasticity of the lumbar support mechanism 36 and the weight of the seated person is applied rearward, and thereby the upper side adjacent portion 411d displaces rearward while rotating with the lower frame 34 being a fulcrum. Similarly, the lower side adjacent portion 412a of the upper pad member 412 displaces rearward while rotating with the upper frame 33 being a fulcrum (state illustrated by solid lines in FIG. 4). As a result, the shapes of support surface parts (surfaces) of the lower pad member 411 and the upper pad member 412 fit by becoming shapes along the curve from lumbar vertebrae to thoracic vertebrae of the seated person, and reaction forces accompanying displacements thereof apply support pressure along the curve from lumbar vertebrae to thoracic vertebrae of the seated person. Accordingly, a relaxed posture which does not hinder smooth breathing of the seated person can be maintained easily.

When an impact force of a predetermined value or higher is applied in such a state and makes the seated person lunge forward, the belt anchor attaching members 117, 118 are pulled via the belt anchor by the seat belt in the same direction, that is, obliquely upward and forward. Accordingly, by this force, the stringers 110, 111 deform in a direction to be pulled obliquely upward (deform from the state of FIG. 13A to the state of 13B) about the vicinities of the coupling positions of the first to third front beams 112, 115, 116 being a center which are coupled fixedly together with the front sub-stringers 1101, 1111. Since three, first to third, front beams 112, 115, 116 are bridged across the front sub-stringers 1101, 1111 and the three-dimensional truss is formed thereby, the vicinities of the front sub-stringers 1101, 1111 do not easily deform, and portions located rearward therefrom deform easily. Further, when they deform, normally, to the stringers 110, 111, a deformation in a spreading direction to escape outward is also applied (see FIG. 13B). By such a deformation in the stringers 110, 111, the applied impact force is absorbed.

Figure 13A:
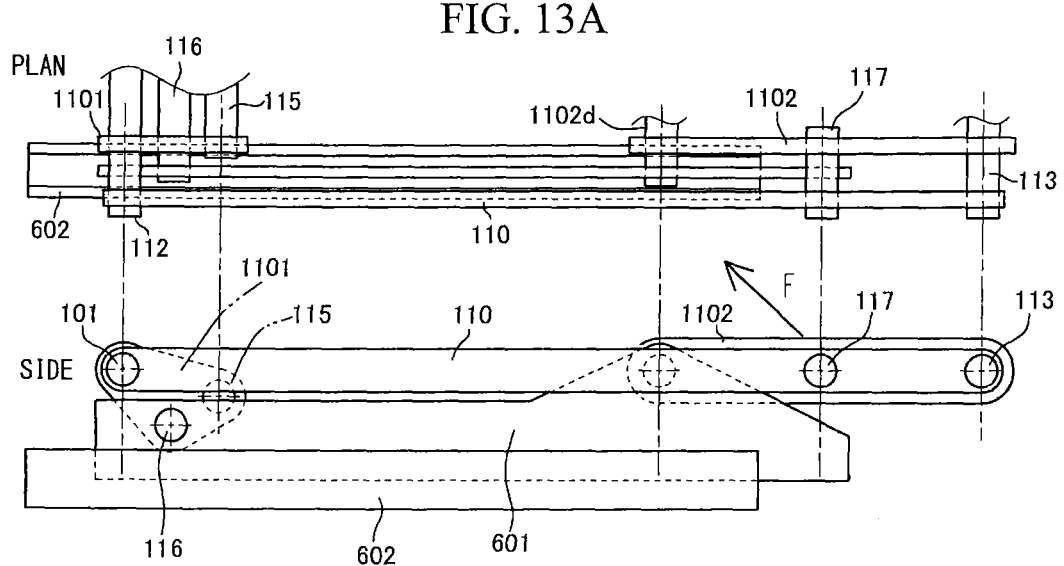
FIGS. 13A, 13B are views for explaining operation of the energy absorbing structure part provided in the vehicle seat according to the embodiment.
Figure 13B:
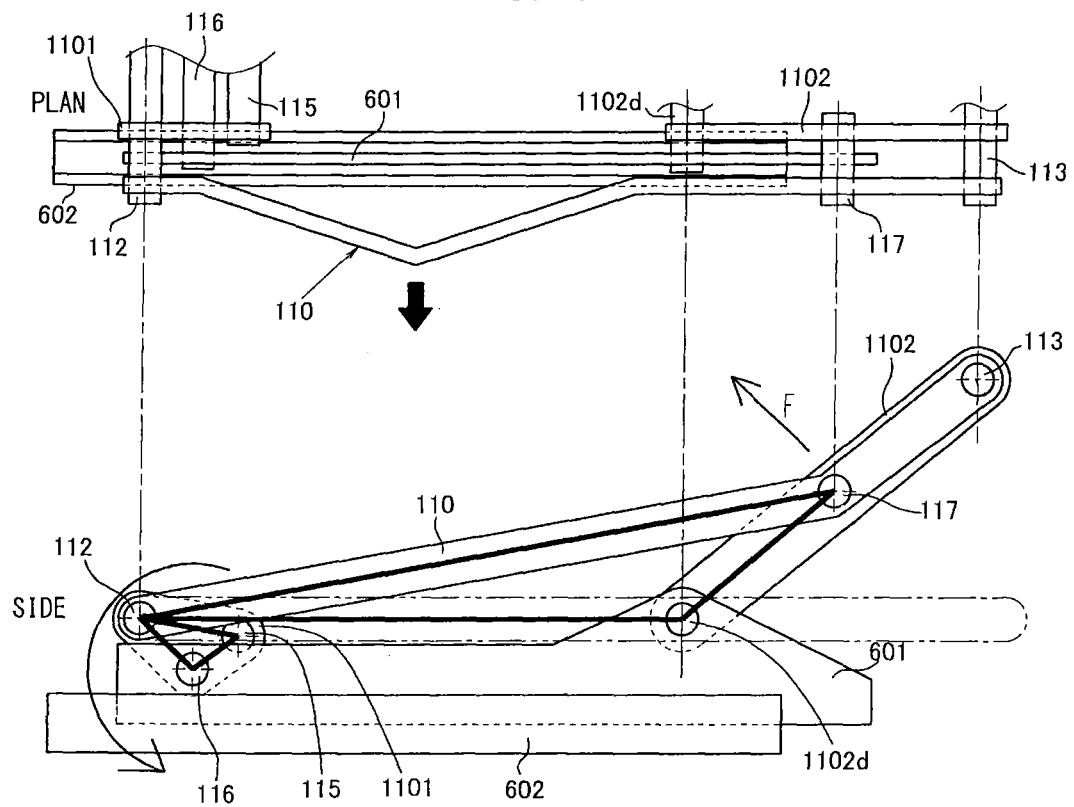

When the stringers 110, 111 generate a deformation as described above, when the stringers 110, 111 are viewed laterally, the disposed positions of the belt anchor attaching members 117, 118 are elevated relative to the coupling positions to the front beams (at least one of the first to third front beams 112, 115, 116 in this embodiment), and the stringers 110, 111 become inclined sides as illustrated in FIG. 13B. Further, the belt anchor attaching members 117, 118 are provided between the pin members 1102d, 1112d and the coupling positions of the rear beam 113 in the first plate portions 1102a, 1112a of the rear sub-stringers 1102, 1112. Accordingly, when the belt anchor attaching members 117, 118 displace upward, since the corner portions of the first plate portions 1102a, 1112a and the second plate portions 1102b, 1112b in the rear sub-stringers 1102, 1112 are coupled to the vicinities of the rear portions of the upper rails 601, 611 by pin members 1102d, 1112d, the rear sub-stringers 1102, 1112 become inclined sides such that, with the pin members 1102d, 1112d being a center, the belt anchor attaching members 117, 118 located on the rear side of them are at elevated positions.

Thus, after undergone a predetermined deformation by receiving an impact force, a truss is newly formed which connects the disposed positions of the belt anchor attaching members 117, 118, the coupling positions to the front beams (at least one of the first to third front beams 112, 115, 116 in this embodiment), and the coupling positions to the vicinities of the rear portions of the upper rails 601, 611 (large triangles indicated by solid lines in FIG. 13B). By such a truss being formed, the impact force which continues to be applied after the deformation can then be received and sustained by the newly formed truss.

Specifically, in this embodiment, when an impact force is received, the impact force is absorbed by the deformation of members including the above-described stringers 110, 111. However, at this time, the disposed positions of the belt anchor attaching members 117, 118 are between coupling positions of the pin members 1102d, 1112d and the rear beam 113 in the rear sub-stringers 1102, 1112, the stringers 110, 111 are also attached firmly to the front beams together with the front sub-stringers 1101, 1111 (that is, the three beams 112, 115, 116 are bridged across the front sub-stringers 1101, 1111 and thereby a three-dimensional truss (small triangle depicted by bold solid lines in FIG. 13B) is formed in advance, making them difficult to deform), and the rear sub-stringers 1102, 1112 are coupled to the upper rails 601, 611. Thus, the impact force of a predetermined value or higher which deforms the belt anchor attaching members 117, 118 obliquely upward and forward causes a deformation to form the above-described truss (large triangle depicted by bold solid lines in FIG. 13B. Therefore, it is the energy absorbing structure part 100 with multi-stages such that after the truss is formed by the above-described deformation, any impact force which cannot be absorbed by the deformation is then sustained and absorbed by the newly formed truss. That is, it is a structure such that the above-described deformation of the energy absorbing structure part 100 after the impact force is inputted enables the cushion frame 10 after the impact force is inputted to exhibit stiffness substantially equal to or more than in the cushion frame 10 in normal use.

Further, as described above, in this embodiment, the material having elasticity is used for the sliders 600, 610. Accordingly, when the impact force is received, a deformation that increases a vertical section modulus occurs, and the impact force can be absorbed also by this.

The vehicle seat 1 of this embodiment has a structure with a low hip point required for sports-type automobiles, and thus has a small number of beams disposed in the vicinities of buttocks of the cushion frame 10 and only has the intermediate beam 114 offset below. Specifically, it is not a structure in which strength is improved by disposing many beams, but by the above-described shock absorbing mechanism of the energy absorbing structure part 100, a predetermined shock absorbing force can be obtained despite the small number of beams.

In the above-described embodiment, as the side frames 11, 12 of the cushion frame 10, ones extending from the lower portions of the back frame 30 to the positions corresponding to the front edge portions of the vehicle seat 1 are used. However, when the energy absorbing structure part 100 as described above is employed, it is also possible to use ones only having a length from the lower portions of the back frame 30 to the vicinity of middle in the forward and backward direction of the vehicle seat 1 as the side frames 11A, 12A, as described in FIG. 14 and FIG. 15, in order to achieve further weight reduction and cost reduction. That is, they are ones having a length of a degree allowing attaching the rear beam 113 and the belt anchor attaching members 117, 118. Note that in FIG. 14 and FIG. 15, same members as in the above-described embodiment are denoted by same reference numerals.

Test Example 1

Figure 14:
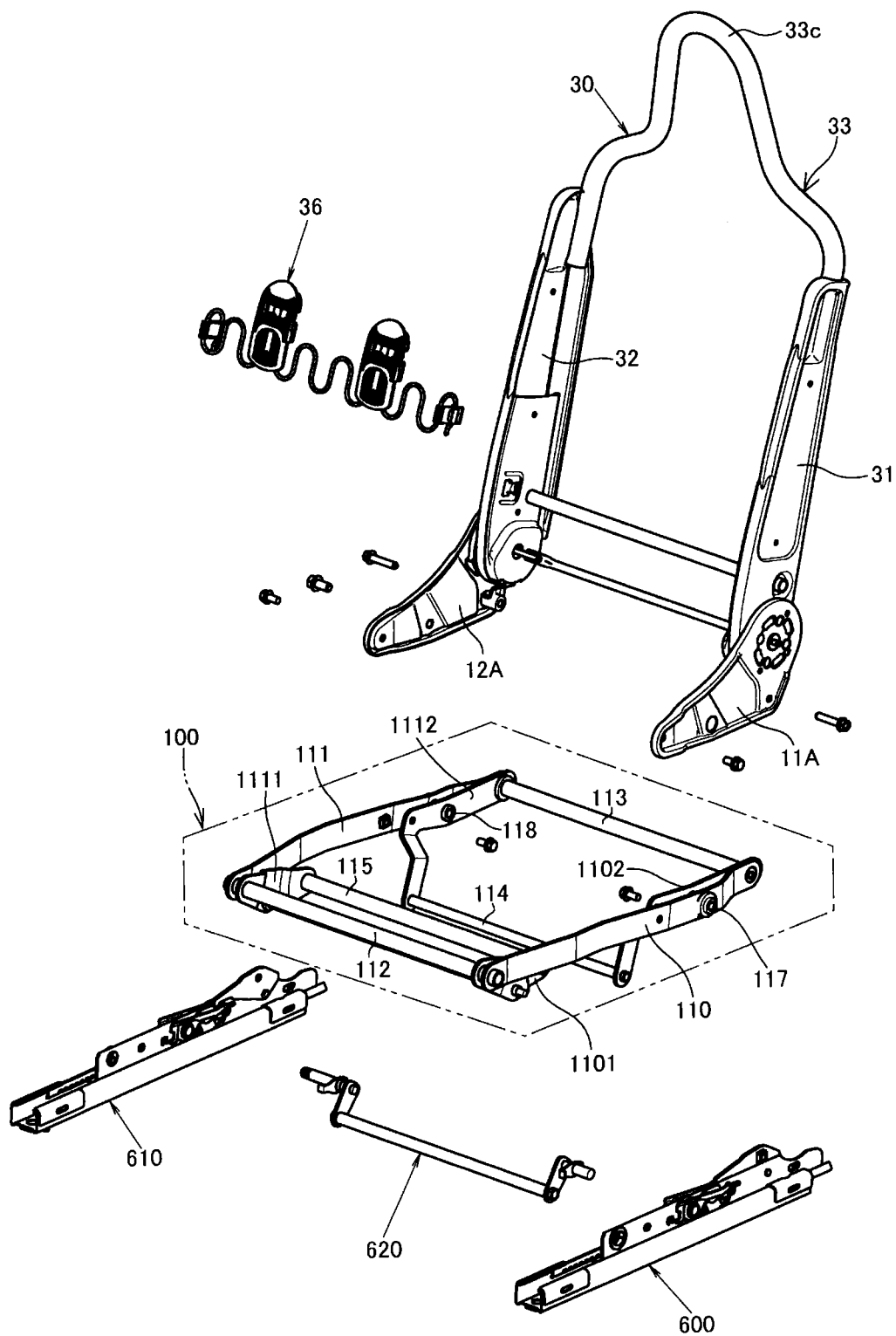
FIG. 14 is an exploded perspective view illustrating a frame structure of a vehicle seat according to a mode in which side frames are shorter than those in the structure illustrated in FIG. 1 to FIG. 12.
Figure 15:
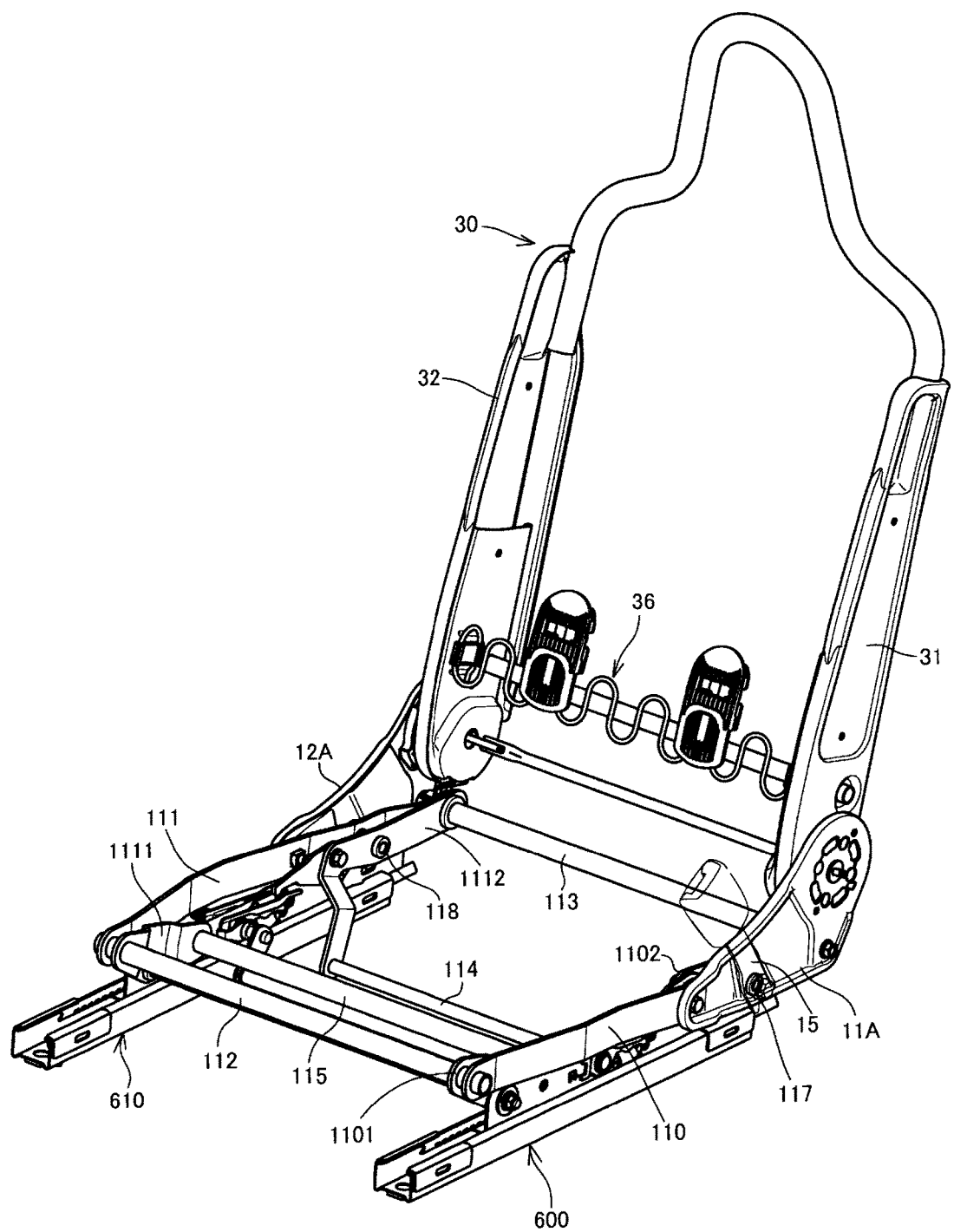
FIG. 15 is a perspective view illustrating a frame structure of the vehicle seat of FIG. 14.
Figure 16:
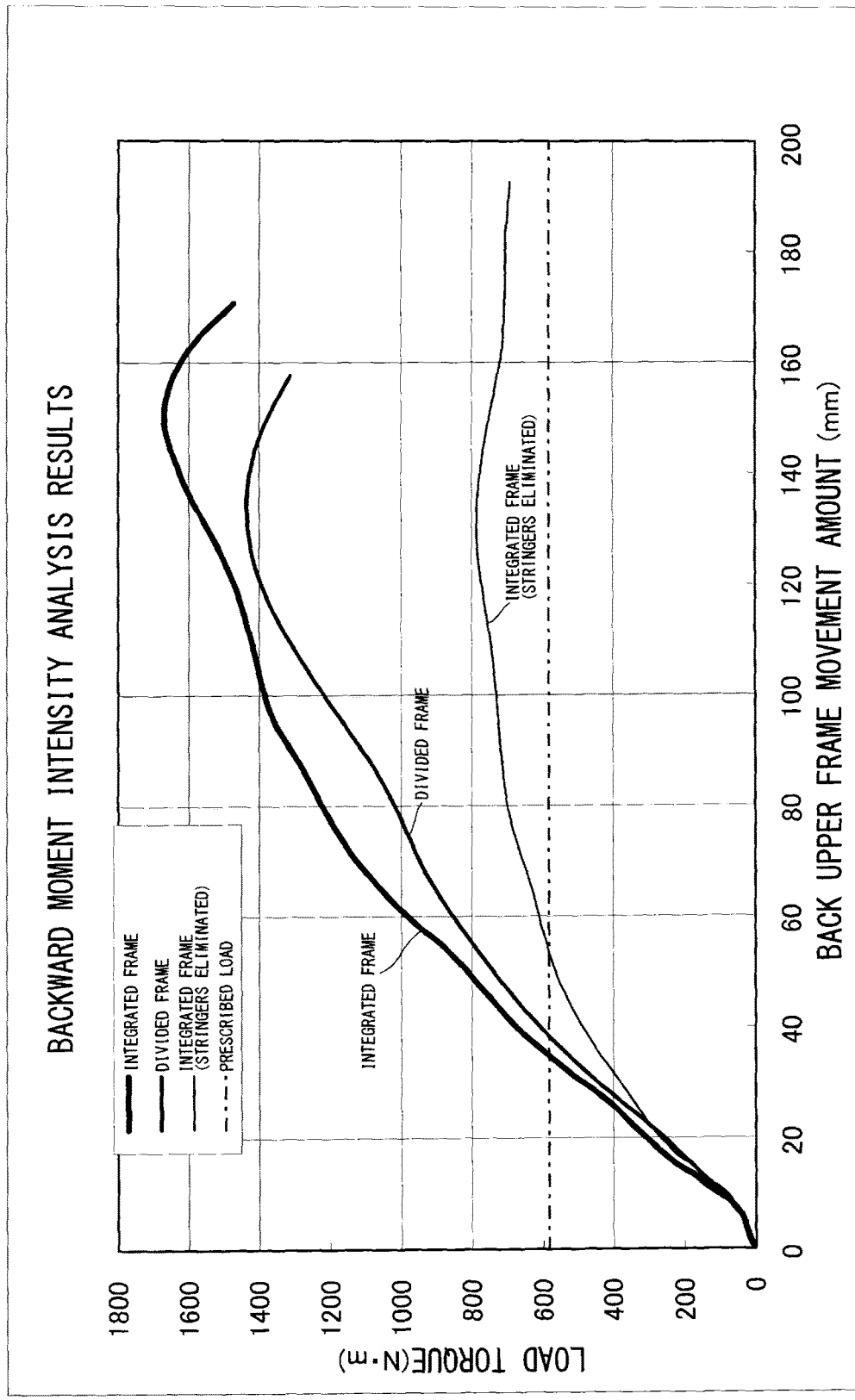
FIG. 16 is a diagram illustrating test results of Test Example 1.

An analysis test of backward moment intensity was performed with respect to ones illustrated in FIG. 1 to FIGS. 12A-12G in which the side frames 11, 12 of the cushion frame 10 extend to positions corresponding to the front edge portion of the vehicle seat 1 (displayed as "integrated frame" in the diagram), and ones illustrated in FIG. 14 and FIG. 15 in which they only have a length to the vicinity of middle in the forward and backward direction of the vehicle seat 1 (displayed as "divided frame" in the diagram). Results are illustrated in FIG. 16. The backward moment intensity is tested by applying a load using a back pan around a seating reference point (hip point).

As a result, both the "integrated frame" and the "divided frame" largely surpassed a prescribed load. However, side frames 11A, 12A of the "divided frame" are shorter than the side frames 11, 12 of the "integrated frame", and thus when the both are compared, the backward moment intensity of the "integrated frame" was higher.

Further, an inclination of graph is smaller in the vicinity of the movement amount of 45 to 50 mm of the horizontal axis in the "integrated frame" and in the vicinity of the movement amount of 55 to 60 mm of the "divided frame" than preceding positions therefrom. This indicates that a deformation has occurred in the energy absorbing structure part 100 including the stringers 110, 111 by increase of the load torque, but as the load torque increases further, the inclination of graph increases again. This indicates that the truss after deformation is formed in the energy absorbing structure part 100 including the stringers 110, 111, and this sustains the load torque. Note that while FIGS. 13A, 13B illustrate a deformation behavior of the energy absorbing structure part 100 including the stringers 110, 111 at a time of front collision, in the case of this test example assuming a rear collision, a deformation occurs such that backward moment is transmitted to the front side via the stringers 110, 111 and so on, the side of the first to the third front beams 112, 115, 116 rises, and the lower rails 602, 612 of the sliders 600, 610 extend in the vertical direction. Therefore, a truss which becomes a triangle approximately line symmetrical to the large triangle depicted with bold solid lines in FIG. 13 is formed, which can exhibit high backward moment intensity.

Specifically, according to this embodiment, it is a structure capable of exhibiting high shock absorbability by the deformation of the energy absorbing structure part 100 and the new truss structure formed after the deformation not only at a time of front collision but also at a time of rear collision.

Figure 17:
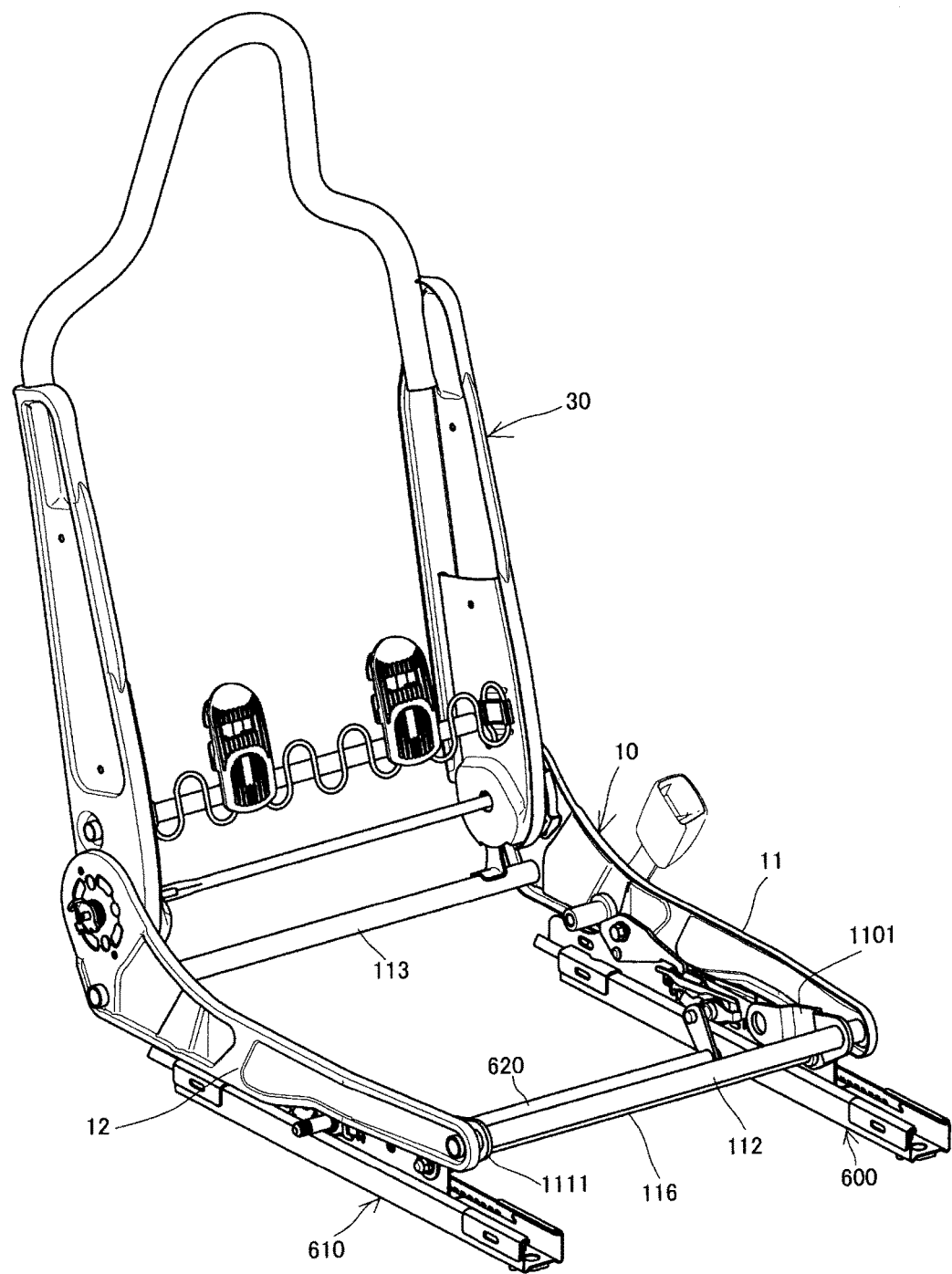
FIG. 17 is a perspective view illustrating a frame structure in which stringers and so on are eliminated from the energy absorbing structure part of the vehicle seat illustrated in FIG. 1 to FIG. 12.
Figure 18:
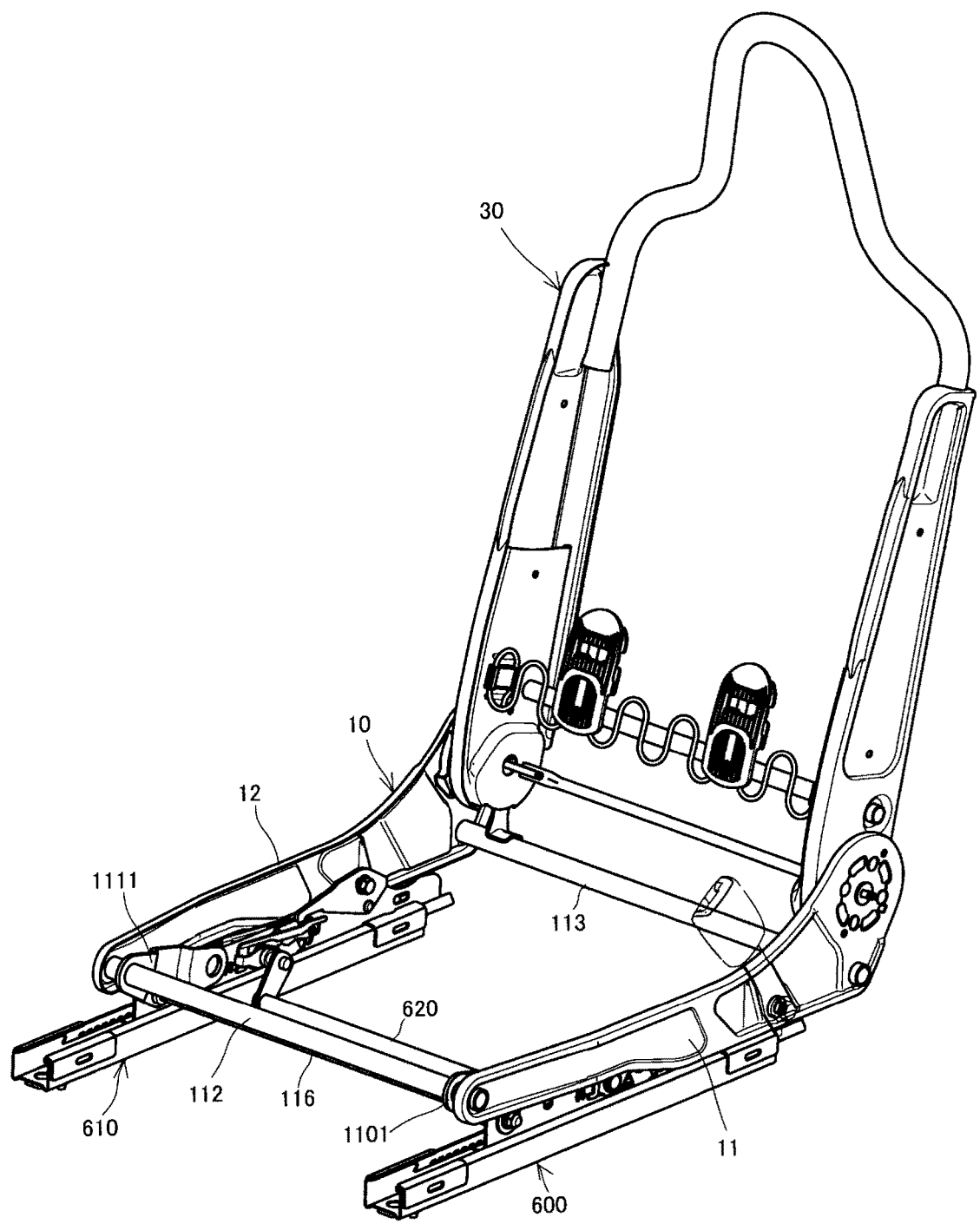
FIG. 18 is a perspective view of the frame structure of FIG. 17 seen from an oblique right front side.

Further, among graphs of FIG. 16, one displayed as "integrated frame (stringers eliminated)" is a test result of backward moment intensity performed for one using the frame structure in which the stringers 110, 111, the rear sub-stringers 1102, 1112, the intermediate beam 114, and the second front beam 115 are eliminated as illustrated in FIG. 17 and FIG. 18 from the energy absorbing structure part 100 of the vehicle seat (integrated frame) illustrated in FIG. 1 to FIGS. 12A-12G. Note that besides them, it has exactly the same structure as the vehicle seat (integrated frame) illustrated in FIG. 1 to FIG. 12.

In the "integrated frame (stringer eliminated)" using the frame structure illustrated in FIG. 17 and FIG. 18, as compared to either of the vehicle seat (displayed as "integrated frame" in the diagram) having the energy absorbing structure part 100 including the stringers 110, 111 illustrated in FIG. 1 to FIGS. 12A-12G and the "divided frame" illustrated in FIGS. 13A, 13B and FIG. 14, the backward moment intensity is about half of them, where it can be seen that the stringers 110, 111 constituting the energy absorbing structure part 100 contribute largely to increasing stiffness.

Test Example 2

Figure 19:
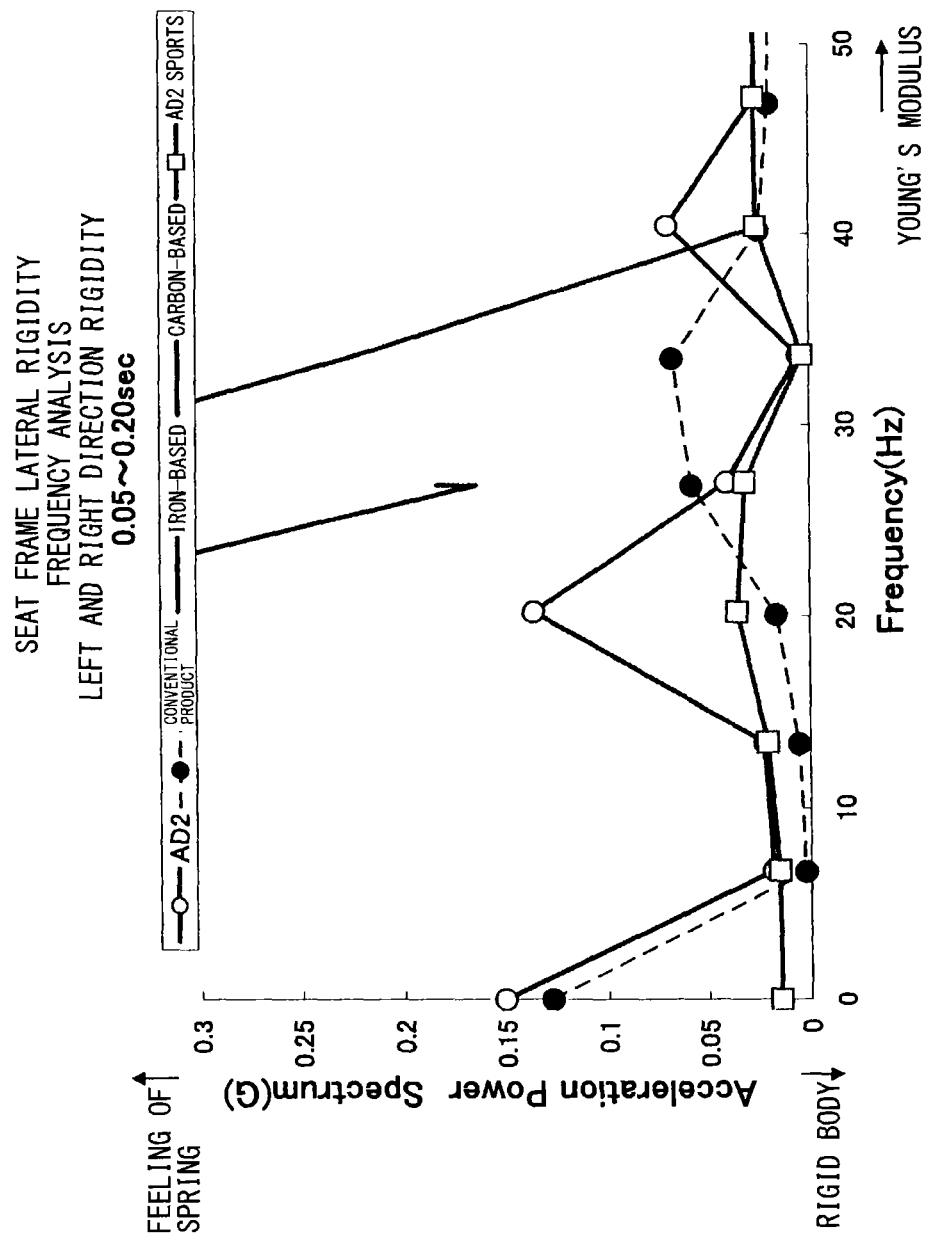
FIG. 19 is a diagram illustrating test results of Test Example 2.
Figure 20:
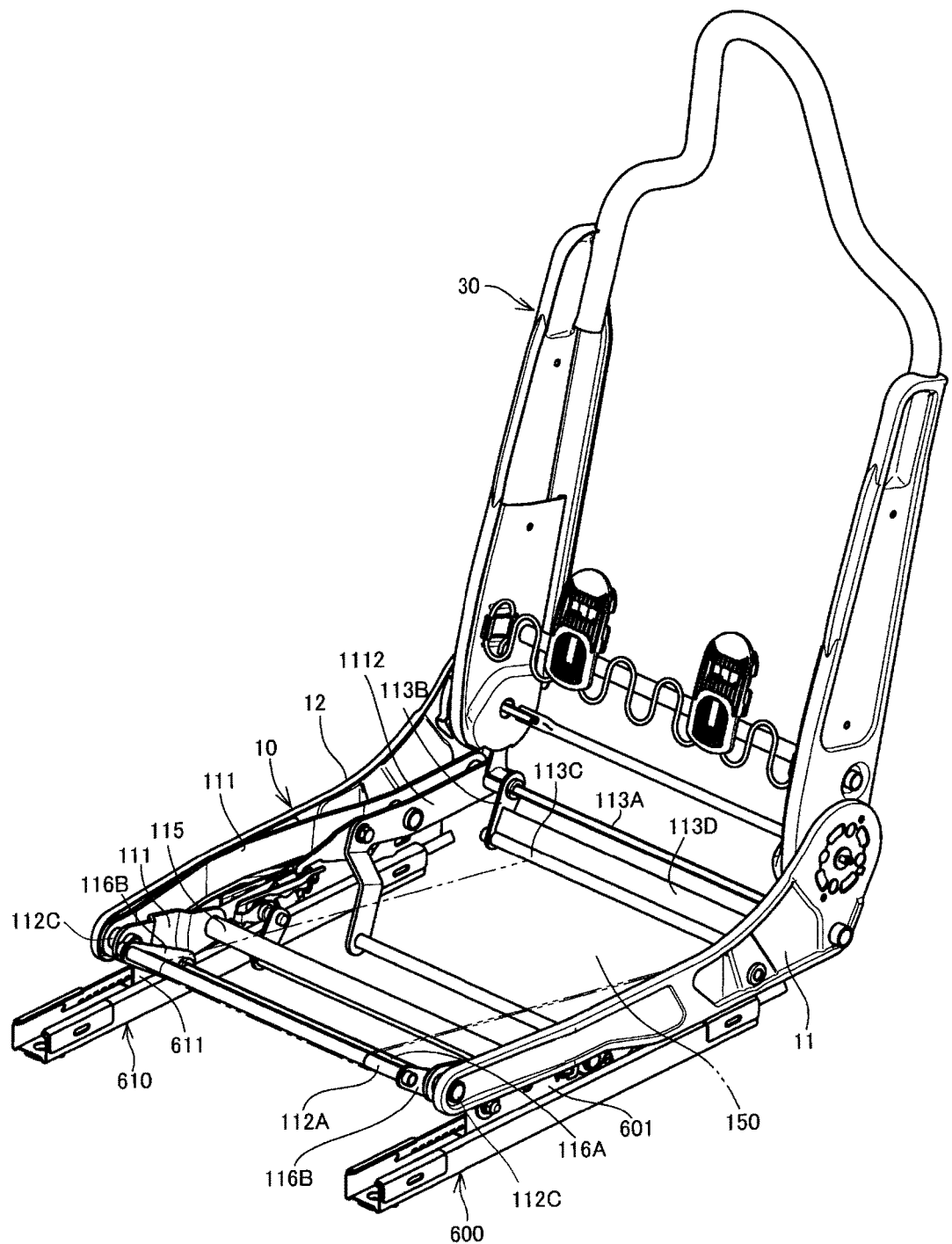
FIG. 20 is a perspective view illustrating a frame structure of a vehicle seat according to another embodiment of the present invention which employs a front torsion bar and a rear torsion bar.
Figure 21:
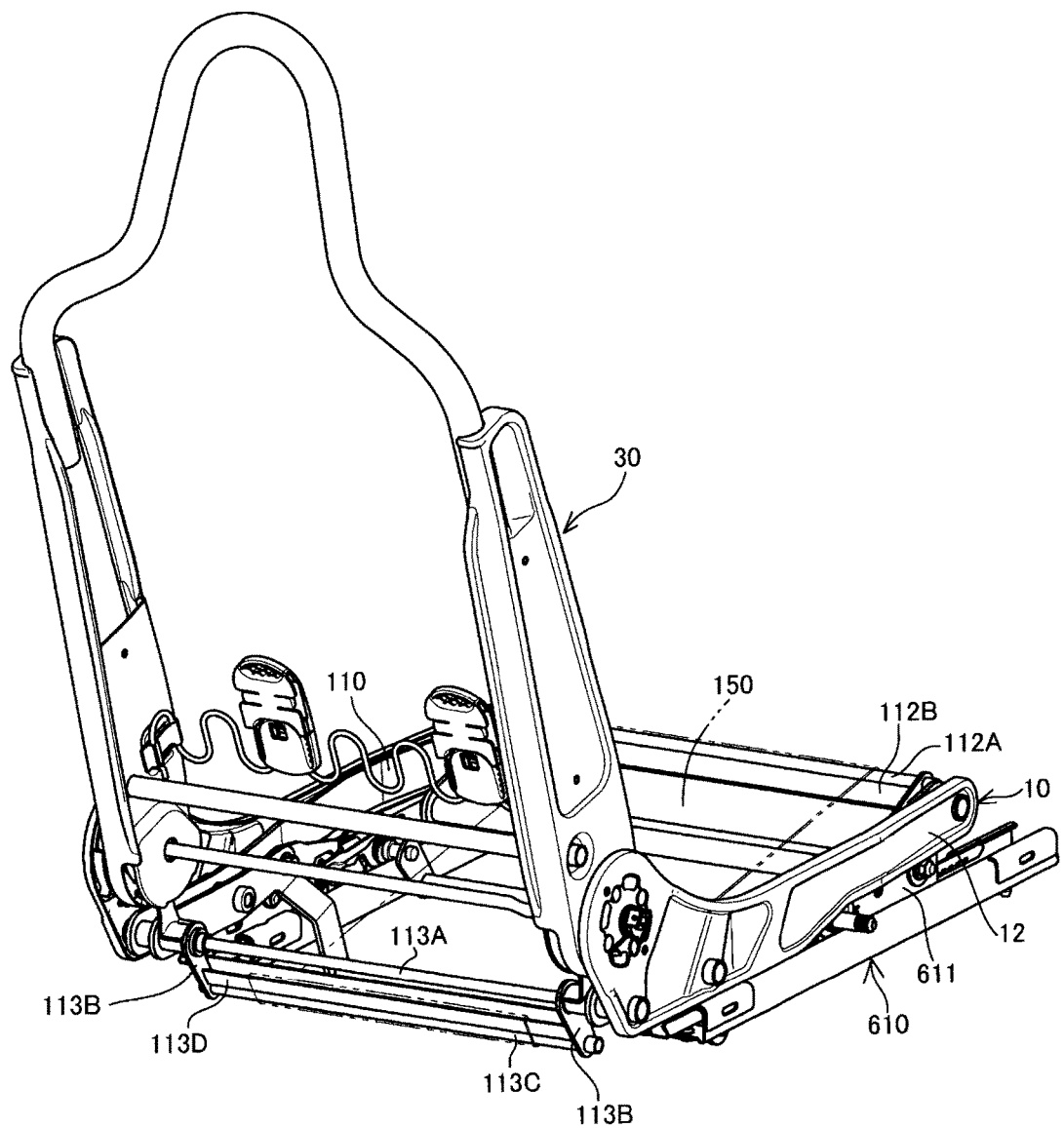
FIG. 21 is a perspective view of the frame structure of FIG. 20 seen from a rear side.
Figure 22A:
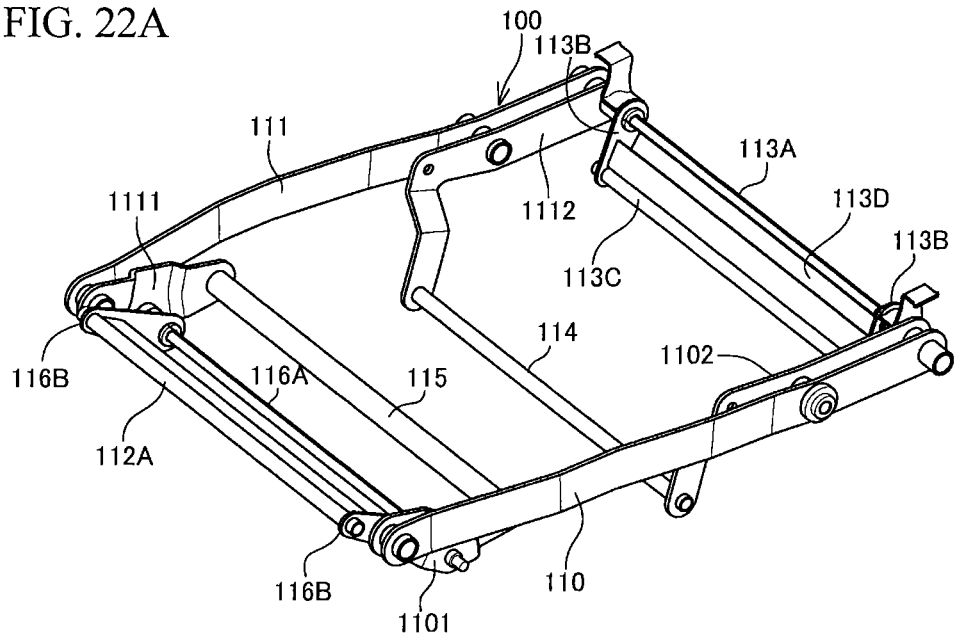
FIG. 22A is a perspective view illustrating an energy absorbing structure part in a vehicle seat according to FIG. 20 seen from a front side.
Figure 22B:
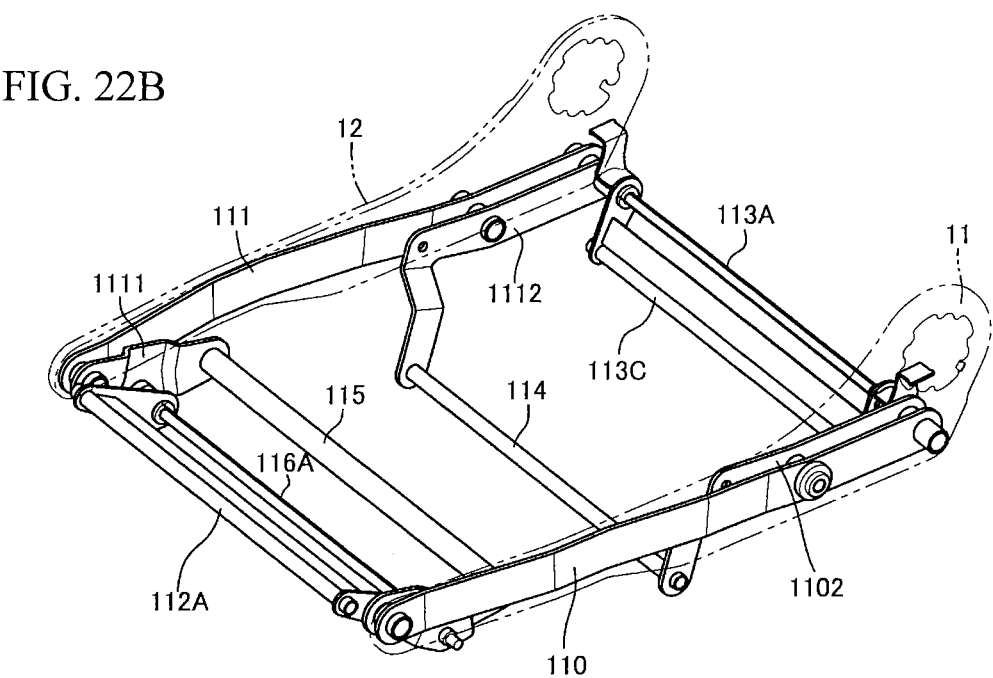
FIG. 22B is a perspective view illustrating the energy absorbing structure part together with side frames seen from the front side.
Figure 23A:
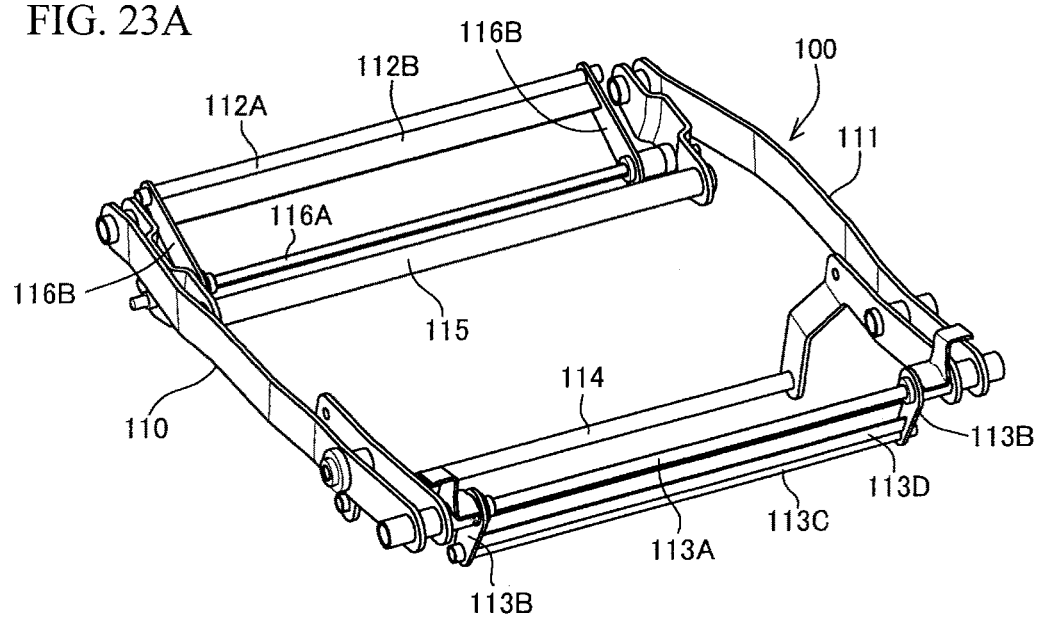
FIG. 23A is a perspective view illustrating an energy absorbing structure part in a vehicle seat according to FIG. 20 seen from a rear side.
Figure 23B:
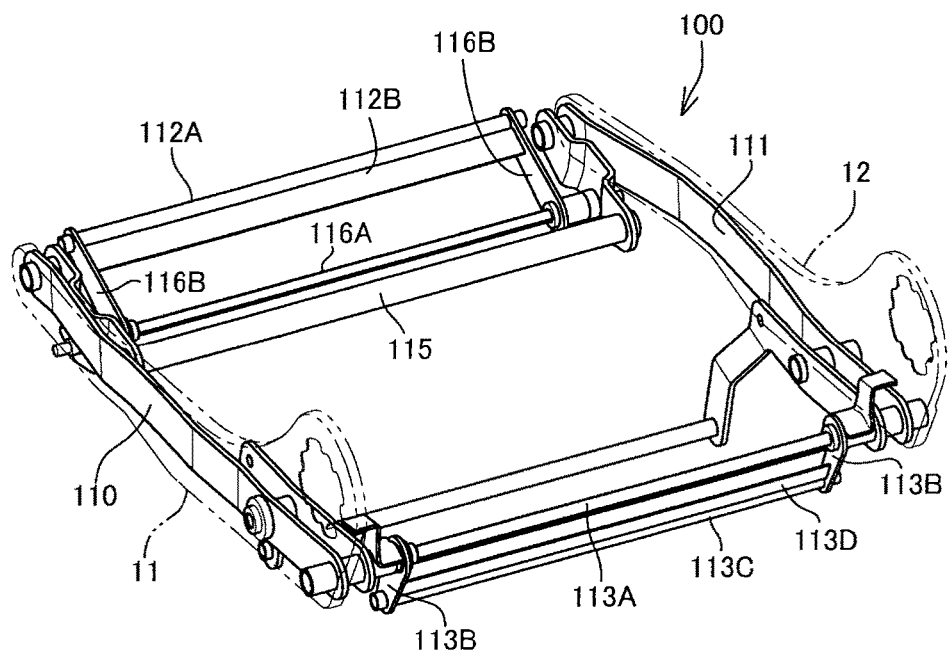
FIG. 23B is a perspective view illustrating the energy absorbing structure part together with side frames seen from the rear side.
Figure 24:
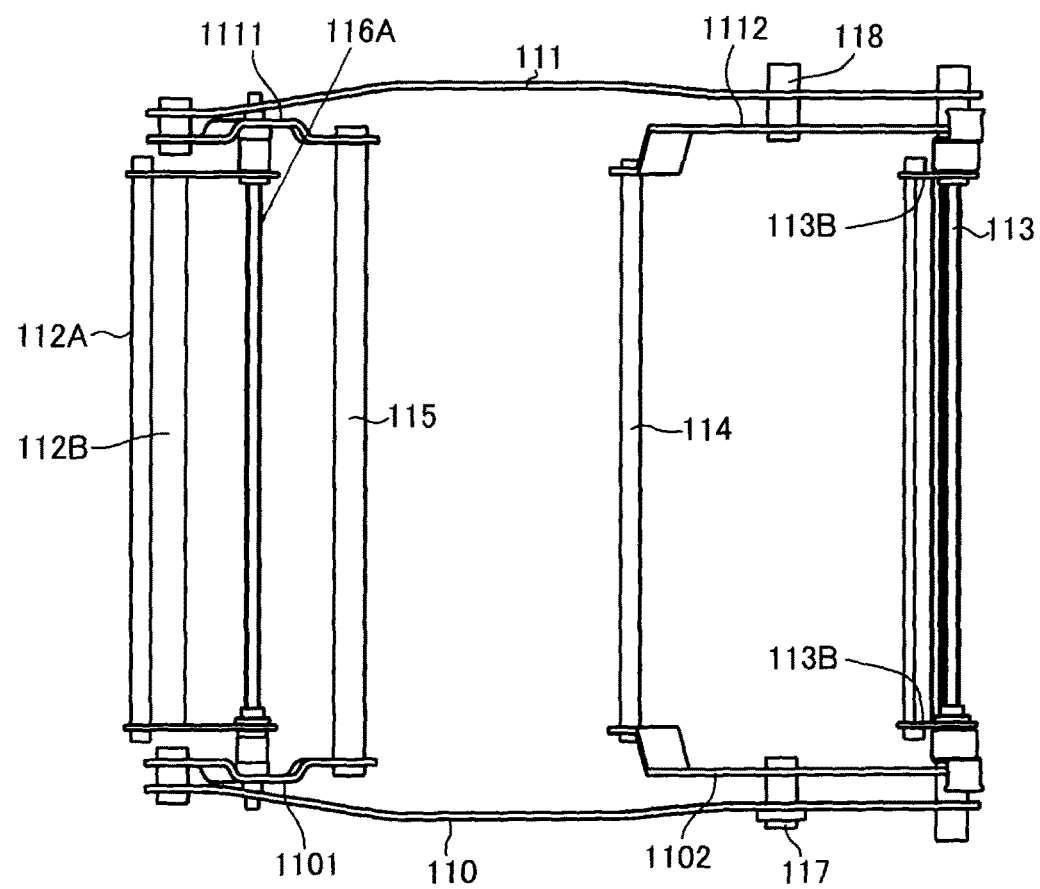
FIG. 24 is a plan view illustrating the energy absorbing structure part in the vehicle seat according to FIG. 20.

On the cushion frame 10 of the vehicle seat 1 according to the embodiment illustrated in FIG. 1 to FIGS. 12A-12G, a frequency analysis was performed using outputs of an acceleration pickup attached to a measurement point by performing input of impact in a left and right direction, so as to check stiffness in a lateral direction of the cushion frame 10. Results thereof are illustrated in FIG. 19. In FIG. 19, one described as "AD2 sports" is an analysis result of the vehicle seat 1 according to the embodiment. For comparison, input points and measurement points were set to similar positions and measurement was performed also on a seat in which no energy absorbing structure part like that of the vehicle seat according to this embodiment is provided and the number of disposed beams bridged across the left and right side frames is increased (AD2), a typical vehicle seat of sedan type in which urethane foam is disposed on a cushion pan (conventional product), a sports type seat formed by iron-based frames (iron-based), and a sports type seat constituted of carbon-based frames (carbon-based).

As is clear from FIG. 19, the "AD2 sports" of this embodiment has quite low vibration transmissibility and high stiffness.

FIG. 20 to FIG. 24 illustrate still another embodiment of the present invention. In this embodiment, torsion bars are employed instead of the third front beam 116 and the rear beam 113 of the above embodiment which penetrate through the front sub-stringers 1101, 1111 and are coupled to the vicinities of front portions of the upper rails 601, 611 of the sliders 600, 610. Specifically, there are disposed a front torsion bar 116A in the position where the third front beam 116 is bridged, and a rear torsion bar 113A in the position where the rear beam 113 is bridged.

On the front torsion bar 116A (equivalent to the third front beam 116), brackets 116B, 116B projecting obliquely upward and forward are provided separately in a width direction, and a first front beam 112A is bridged across these brackets 116B, 116B. Note that in this embodiment, since the both ends of the first front beam 112A are not inserted through the first through holes 1101a, 1111a of the front sub-stringers 1101, 1111, fixing members 112C, 112C penetrating across the first through holes 1101a, 1111a and the front ends of the side frames 11, 12 are provided instead.

On the rear torsion bar 113A (equivalent to the rear beam 113), brackets 113B, 113B projecting obliquely forward and downward are provided separately in a width direction, and a rear support frame 113C is bridged across these brackets 113B, 113B.

Between the first front beam 112A and the rear support frame 113C, engagement members 112B and 113D with a substantially U cross section are attached respectively, and respective ends of a flat support member 150 supporting a lower face of the pad member 21 are engaged and disposed on the engagement members 112B and 113D. Note that the flat support member 150 is preferably constituted of a two-dimensional or three-dimensional fabric. The types of the fabric are not particularly limited and include all of woven fabric, knitted fabric, and non-woven fabric. For example, a two-dimensional cloth, net-like one, three-dimensional knitted fabric, or one of them which at least partially includes an elastic yarn and has increased elasticity, or the like may be used. Then, the front pad member 211 and the rear pad member 212 constituting the pad member 21 is disposed on the above-described flat support member 150, and its surface is covered with the outer layer member 22.

According to this embodiment, since the pad member 21 is disposed on the flat support member 150 elastically supported by the front torsion bar 116A and the rear torsion bar 113A, it is a structure in which rotational movement takes place in a forward and backward direction about the front torsion bar 116A and the rear torsion bar 113A. Therefore, vibrations inputted from the road surface during traveling can be absorbed efficiently by this rotational movement. When the front torsion bar 116A and the rear torsion bar 113A are provided in this manner, a vibration absorbing function by their elasticity can be applied, and thus one with a smaller thickness may be used as the pad member 21. It is possible to use a three-dimensional knitted fabric as the pad members instead of the urethane foam. The structure besides this is similar to the above-described embodiment, and it is also similar in that if an impact force of a predetermined value or higher is received, the energy absorbing structure part 100 deforms to form a new truss structure, enabling to sustain a further impact force.

Note that instead of employing the torsion bars 116A, 113A in both the front portions and the rear portions as in this embodiment, at least one of them may be a torsion bar. However, in view of vibration absorbability, a structure employing the torsion bars 116A, 113A in both the front portions and the rear portions as in this embodiment is preferred.

Figure 26:
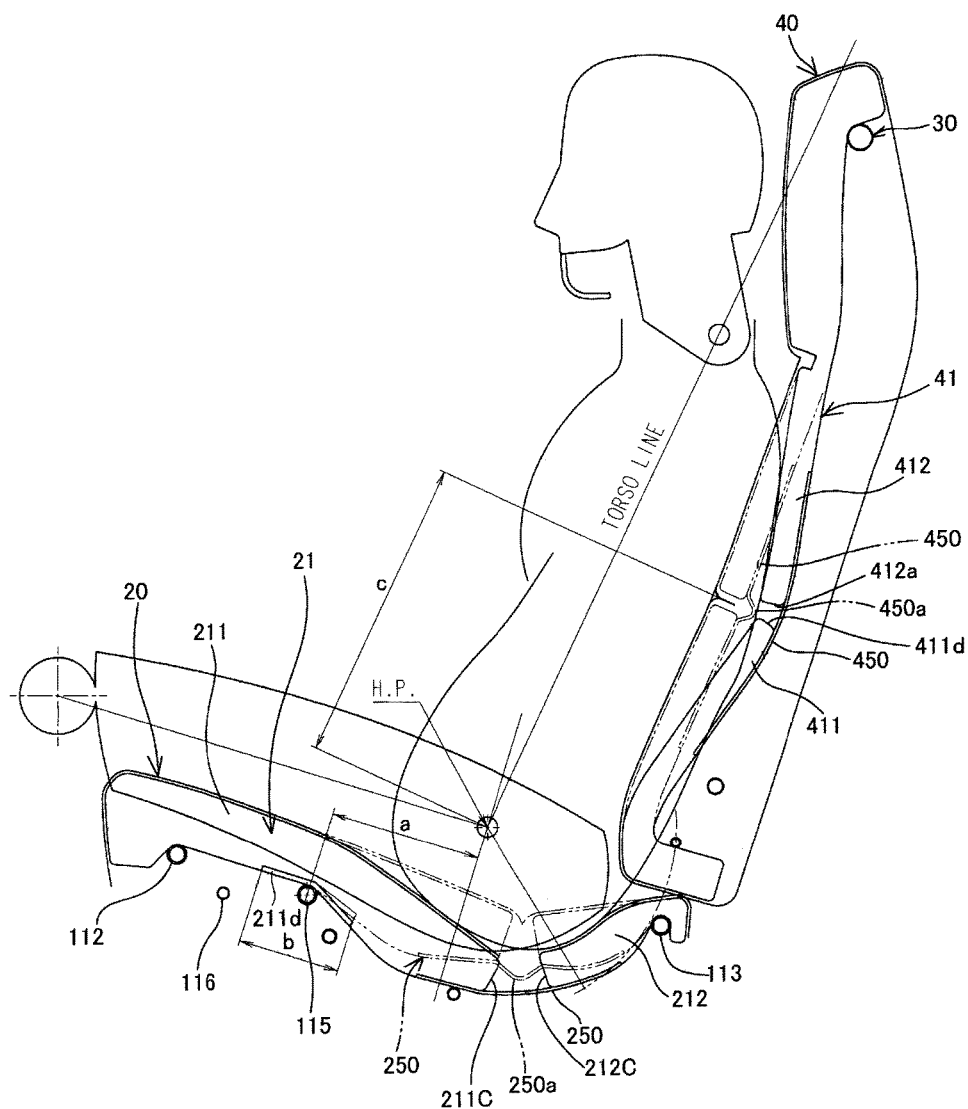
FIG. 26 is a center cross-sectional view of the vehicle seat according to the embodiment of FIG. 25.

FIGS. 25A, 25B and FIG. 26 are views illustrating still another embodiment of the present invention. In this embodiment, displacement amount restricting fabrics (two-dimensional fabric or net, or three-dimensional knitted fabric, or the like) 250, 450 are integrally foamed on rear surface sides, respectively, across the front pad member 211 and the rear pad member 212 constituting the pad member 21 of the seat cushion part cushion member 20, and across the lower pad member 411 and the upper pad member 412 constituting the pad member 41 of the seat back part cushion member 40.

The displacement amount restricting fabrics 250, 450 are provided so that loosening parts 250a, 450a are made respectively between the front pad member 211 and the rear pad member 212 or between the lower pad member 411 and the upper pad member 412 at a time of no load (two-dot chain line in FIG. 26). Thus, when a person sits down, the rear side adjacent portion 211c of the front pad member 211 and the front side adjacent portion 212c of the rear pad member 212 move downward, or the upper side adjacent portion 411d of the lower pad member 411 and the lower side adjacent portion 412a of the upper pad member 412 move rearward. Then, the loosening parts 250a, 450a of the integrally foamed displacement amount restricting fabrics 250, 450 stretch to be in positions of solid lines in FIG. 26. Thus, downward displacement amounts of the rear side adjacent portion 211c of the front pad member 211 and the front side adjacent portion 212c of the rear pad member 212, and rearward displacement amounts of the upper side adjacent portion 411d of the lower pad member 411 and the lower side adjacent portion 412a of the upper pad member 412 can be restricted respectively. Further, by adjusting loosening lengths of the loosening parts 250a, 450a, selection of materials of the integrally foamed fabrics (one with high elasticity, one with low elasticity, or the like) and the like, downward or rearward displacement amounts of respective adjacent portions can also be adjusted so as to adjust sense of stroking and sense of fitting.

Figures 27A, 27B, 27C:
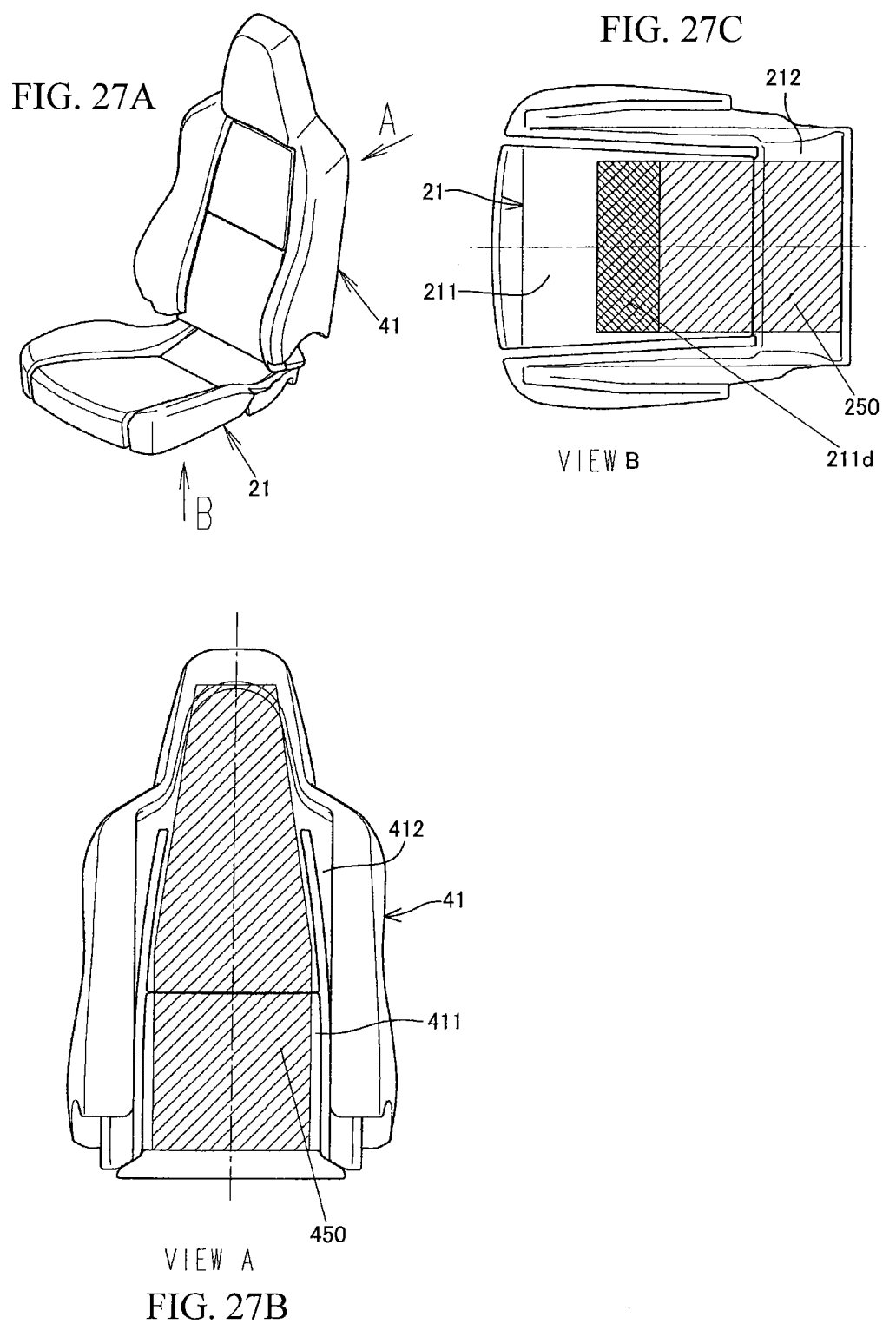
Figure 28:
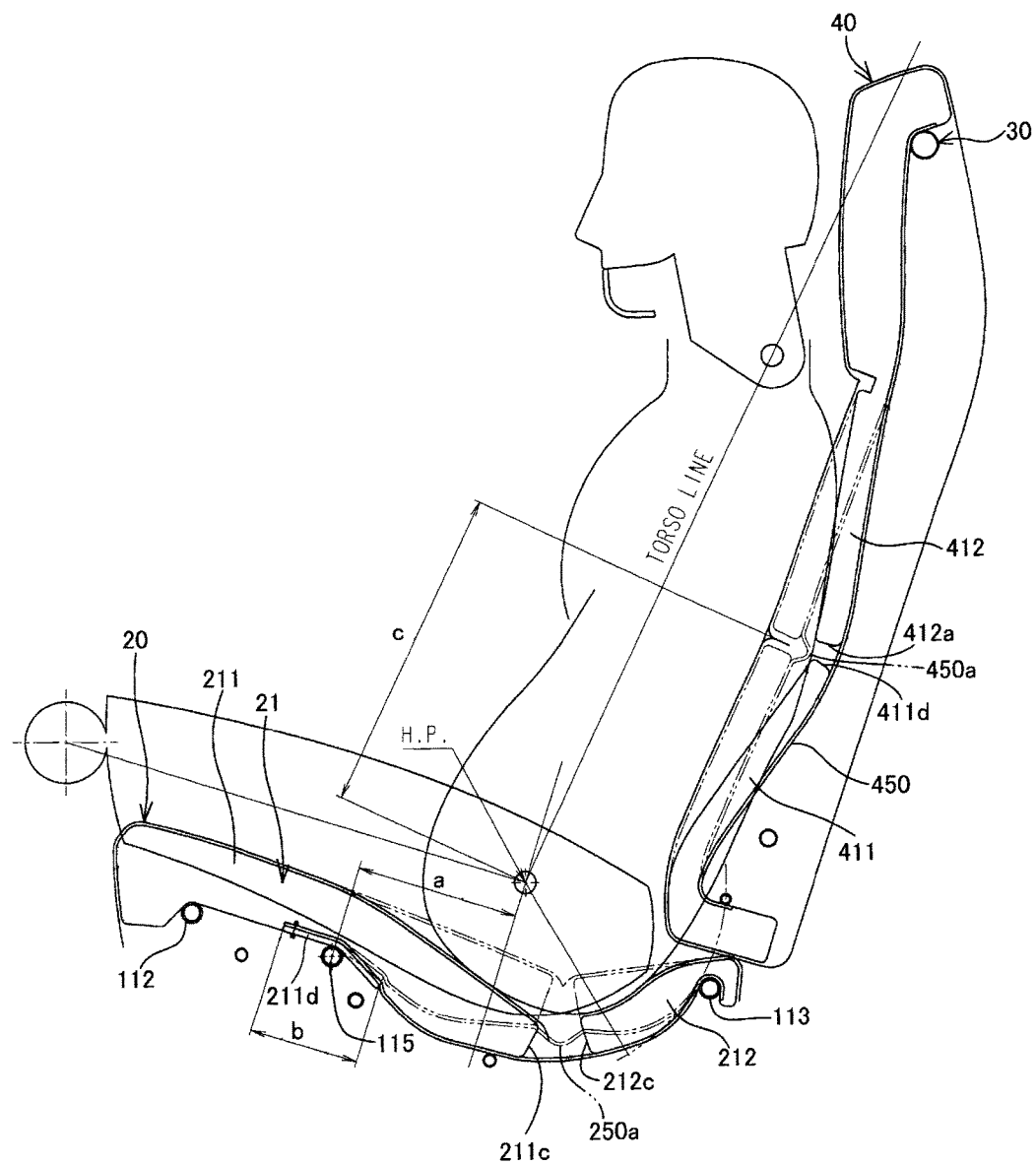
FIG. 28 is a center cross-sectional view of the vehicle seat according to the embodiment of FIG. 27.
Figure 29A:
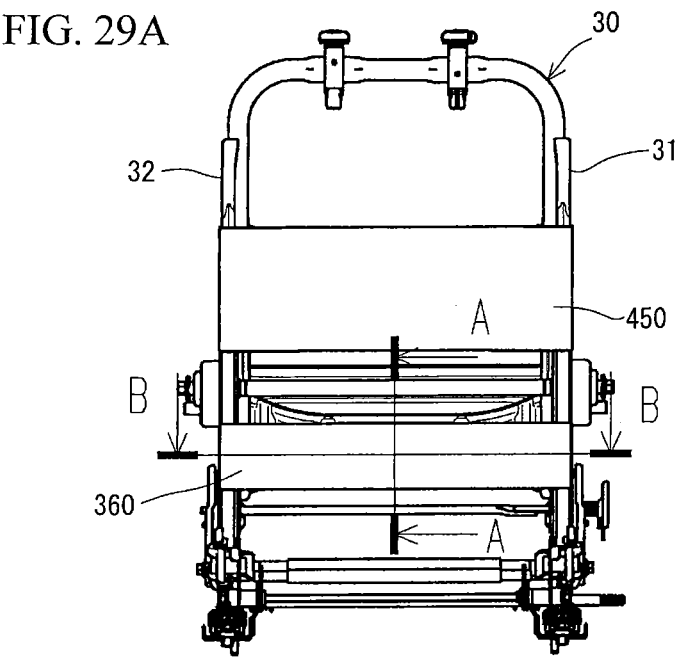
FIG. 29A is a front view illustrating a frame structure of a vehicle seat using a band-shaped lumber support member as a lumbar support mechanism.
Figure 29B:
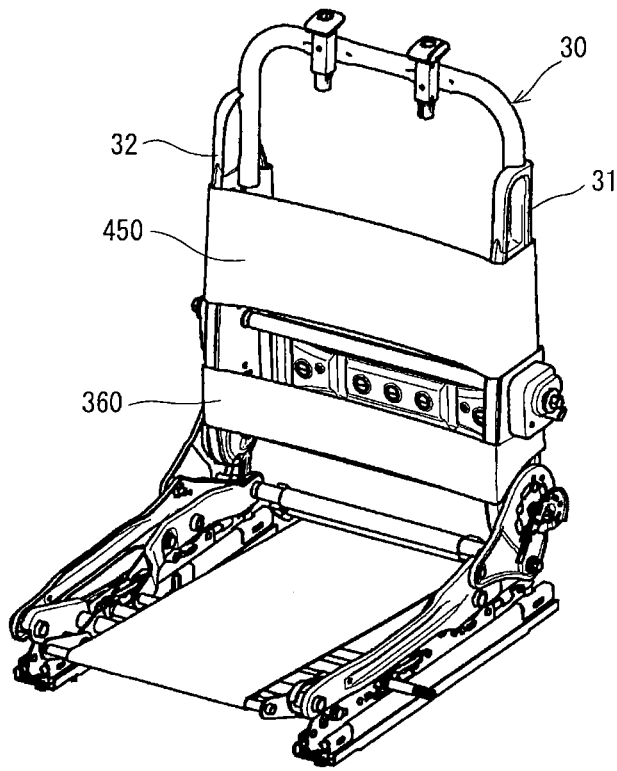
FIG. 29B is a perspective view thereof.

In FIGS. 25A, 25B and FIG. 26, the displacement amount restricting fabrics 250, 450 are just disposed around a boundary between the front pad member 211 and the rear pad member 212 or around a boundary between the lower pad member 411 and the upper pad member 412, but they may be foamed integrally with the pad members 21, 41 by larger areas as in FIGS. 27A-27C and FIG. 28. By changing the areas of the displacement amount restricting fabrics 250, 450, adjustment of stroking sense, and the like, of the pad members 21, 41 can also be performed. Further, it can be structured such that, as illustrated in FIG. 27 and FIG. 28, a stiff member (such as a felt) 211d provided on the lower surface of the second front beam 115 is integrated in advance by sewing or the like with the displacement amount restricting fabric 250 disposed on the seat cushion part cushion member 20 side, and in this state, the both are integrally foamed with the pad member 21. This can simplify manufacturing processes. Note that while the displacement amount restricting fabrics 250, 450 are provided on both the seat cushion part side and the seat back part side as illustrated in FIG. 25 to FIG. 28, it is of course possible to provide them on only one of them.

FIGS. 29A, 29B and FIGS. 30A, 30B illustrate an embodiment using a band-shaped lumber support member 360 as the lumbar support mechanism provided in a lumbar corresponding position below the displacement amount restricting fabric 450 provided on the seat back part. In the above-described embodiment, as illustrated in FIG. 4, FIG. 6, FIG. 9 and FIG. 15, and so on, ones constituted of two support plates 36b provided with a predetermined interval from the spring member (metal S spring) 36a bridged across the side frames 31, 32 of the back frame 30 are used as the lumbar support mechanism 36. Since not only the spring member 36a constituted of a metal S spring but also the support plates 36b made of synthetic resin with a predetermined area are used together, the lumbar support mechanism 36 illustrated in FIG. 4 and so on have a large support area for a lumbar region and is preferable compared to a typical structure constituted only of an S spring. However, when the band-shaped lumber support member 360 illustrated in FIGS. 29A, 29B and FIGS. 30A, 30B is also used, this can contribute to further improvement of seating feeling.

Figure 30A:
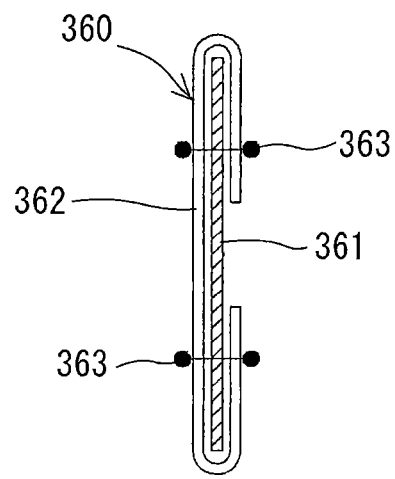
FIG. 30A is a view of arrow A-A in FIG. 29A.
Figure 30B:
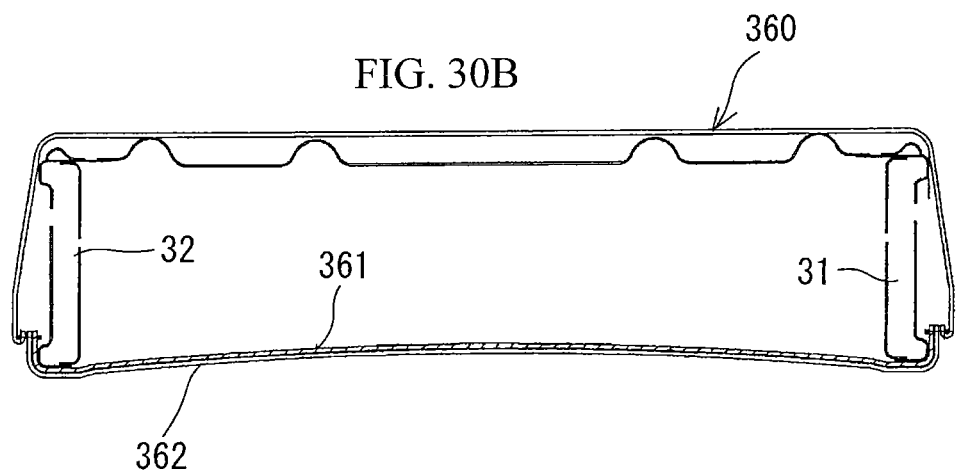
FIG. 30B is a view of arrow B-B in FIG. 29A.

Specifically, this band-shaped lumber support member 360 is constituted of a combination of a band-shaped rubber 361 and a band-shaped fabric 362 having predetermined lengths and widths. The band-shaped rubber 361 has a length to be over the side frames 31, 32 of the back frame 30. The band-shaped fabric 362 is formed of a fabric having predetermined elasticity, preferably, a three-dimensional knitted fabric, and as illustrated in FIG. 30B, it is longer than the rubber 361 and formed in a loop shape, and has a length which can be wrapped around the side frames 31, 32.

The band-shaped fabric 362 covers at least the front surface of the rubber 361. Specifically, as illustrated in FIG. 30A, it is wrapped in a width direction of the rubber 361 so as to cover the front surface of the rubber 361 and be stacked on portions of a rear surface side, and is integrated by sewing with a yarn 363 in overlapping ranges.

The band-shaped lumber support member 360 constituted of the band-shaped rubber 361 and the band-shaped fabric 362 illustrated in FIGS. 29A, 29B and FIGS. 30A, 30B can support a lumbar region by an effect of elasticity of both the rubber 361 and the band-shaped fabric 362 without using a hard member of metal or the like, and thus feeling of foreign object is small when the lumber region is pressed against the seat back part. Further, since both the band-shaped rubber 361 and the band-shaped fabric 362 have a predetermined width (for example, about 5 to 12 cm) and are bridged across the side frames 31, 32, the support area for the lumbar region is larger than the above-described embodiment, and feeling of local contact is smaller, which excel in supportability. Moreover, even when the lumbar region is moved left and right, it can securely serve the lumbar support function. Therefore, it is suitable for the lumbar support mechanism of particularly a seat in many cases of long distance operation, such as a driver's seat of a truck or a bus. Moreover, since it is band-shaped, it can be disposed by just wrapping around the side frames 31, 32, and operation of building in is easy.

EXPLANATION OF REFERENCE SYMBOLS 1 vehicle seat
1A seat cushion part
1B seat back part
10 cushion frame
11, 12 side frame
100 energy absorbing structure part
110, 111 stringer
1101, 1111 front sub-stringer
1102, 1112 rear sub-stringer
112 first front beam
115 second front beam
116 third front beam
116A front torsion bar
113 rear beam
113A rear torsion bar
114 intermediate beam
117, 118 belt anchor attaching member
20 seat cushion part cushion member
21 pad member
211 front pad member
212 rear pad member
22 outer layer member
30 back frame
31, 32 side frame
33 upper frame
34 auxiliary frame
36 lumbar support mechanism
360 band-shaped lumber support member
40 seat back part cushion member
41 pad member
411 lower pad member
412 upper pad member
42 outer layer member
50 reclining mechanism
600, 610 slider
601, 611 upper rail
602, 612 lower rail

The invention claimed is:
1. A vehicle seat comprising a seat cushion part and a seat back part, wherein
the seat cushion part comprises a cushion frame supporting a seat cushion part cushion member,
an energy absorbing structure part is disposed inside left and right side frames constituting the cushion frame, and
the energy absorbing structure part is a frame body in a substantially square shape in plan view, the frame body comprising:
a pair of left and right stringers supported on upper rails of sliders provided on left and right sides of the frame body, respectively, and each disposed along a forward and backward direction inside the side frames; and a front beam and a rear beam bridged across front portions and rear portions, respectively, of the pair of stringers, belt anchor attaching members are each provided between a coupling position of respective stringers to a vicinity of a rear portion of the upper rails and a coupling position of the rear beam in respective ones of the stringers, wherein, on each side, the belt anchor attaching member, the coupling position of the stringer to the upper rail, and the coupling position of the stringer to the front beam are each generally disposed in a line, and the vehicle seat is structured such that a deformation of the stringers accompanying an upward displacement of the belt anchor attaching members by an impact force of a predetermined value or higher absorbs the impact force, the deformation of the stringers forms a truss which couples the belt anchor attaching members, to the front beam, and to the vicinity of the rear portion of the upper rails, wherein the belt anchor attaching member, the coupling position of the stringer to the upper rail, and the coupling position of the stringer to the front beam define a triangle on each side of the frame body after the deformation, and this truss further resists the impact force at least temporarily.

2. The vehicle seat according to claim 1, wherein the pair of left and right stringers is disposed along the forward and backward direction between the upper rails of the sliders and the side frames, the vehicle seat has a pair of left and right sub-stringers, disposed inside the respective upper rails of the sliders along the forward and backward direction at positions corresponding to at least vicinities of front portions and vicinities of rear portions of the stringers, and coupled to vicinities of the front portions and vicinities of the rear portions of the upper rails, the front beam and the rear beam are bridged across the front portions and the rear portions, respectively, of the pair of stringers by penetrating through the sub-stringers, and the belt anchor attaching members are each disposed by penetration to form a two-position support structure supported on one of the stringers and one of the sub-stringers which are on opposite sides of respective upper rails such that each of the belt anchor attaching members is disposed between a coupling position to the vicinity of a rear portion of the upper rails and a coupling position of the rear beam in the sub-stringers.

3. The vehicle seat according to claim 2, wherein the pair of left and right sub-stringers has front sub-stringers and rear sub-stringers, the front sub-stringers are coupled to the vicinities of the front portions of the upper rails and coupled to the front beam, the rear sub-stringers are coupled to the vicinities of the rear portions of the upper rails and coupled to the rear beam, and the belt anchor attaching members are each disposed between the coupling position to the vicinity of the rear portion of the upper rails and the coupling position of the rear beam and bridged across one of the stringers and one of the rear sub-stringers.

4. The vehicle seat according to claim 3, wherein the belt anchor attaching members are each bridged across three members which are one of the side frames, one of the stringers and one of the rear sub-stringers.

5. The vehicle seat according to claim 1, wherein the stringers also deform in a width direction, in addition to an upward deformation.

6. The vehicle seat according to claim 1, further comprising an intermediate beam bridged in a width direction between the front beam and the rear beam and supporting the cushion member, wherein the intermediate beam is disposed with an offset below disposed positions of both the front beam and the rear beam.

7. The vehicle seat according to claim 6, wherein the front beam is constituted of a plurality of beams comprising at least a first front beam disposed foremost, a second front beam disposed between the first front beam and the intermediate beam, a third front beam penetrating the front sub-stringers and coupled to the vicinities of the front portions of the upper rails of the sliders between the first front beam and the second front beam.

8. The vehicle seat according to claim 7, wherein the seat cushion part cushion member is structured to have a pad member and an outer layer member covering the pad member, the pad member has a front pad member located on a front side of a boundary being any point in a range of 100 mm forward and backward from immediately below a reference, and a rear pad member located on a rear side of the boundary, the intermediate beam is provided in a range located below the front pad member, and the seat cushion part cushion member is structured such that, during seating, in the front pad member a rear side adjacent portion thereof displaces downward while rotating with the second front beam being a fulcrum until abutting the intermediate beam, in the rear pad member a front side adjacent portion thereof displaces downward while rotating with the rear beam being a fulcrum, and reaction forces thereof apply support pressure from forward and backward directions.

9. The vehicle seat according to claim 8, wherein side pad members are provided integrally on both side portions of the rear pad member, and the side pad members are structured to be supported on the side frames, respectively.

10. The vehicle seat according to claim 8, wherein the second front beam is provided in a range of 120 to 180 mm on a front side relative to the reference by distance on a straight line coupling the reference to another reference forward of the seat cushion part.

11. The vehicle seat according to claim 8, wherein the front pad member in a range of 20 to 80 mm forward and backward with the second front beam being a center is provided with a stiff member increasing stiffness more than other portions.

12. The vehicle seat according to claim 7, wherein on rear surface sides of the front pad member and the rear pad member, there is disposed a displacement amount restricting fabric foamed integrally across the pad members and restricting displacement amounts of the rear side adjacent portion of the front pad member and the front side adjacent portion of the rear pad member.

13. The vehicle seat according to claim 1, wherein a seat back part cushion member supported by a back frame of the seat back part is structured to have a pad member and an outer layer member covering the pad member, the pad member has a lower pad member located below a boundary being any point in a range of 250 to 350 mm from a reference and an upper pad member located above the boundary, and the seat back part cushion member is structured such that, during seating, in the lower pad member an upper side adjacent portion thereof displaces rearward while rotating with a lower frame of the back frame being a fulcrum, in the upper pad member a lower side adjacent portion thereof displaces rearward while rotating with an upper frame of the back frame being a fulcrum, and reaction forces thereof apply support pressure along a curve in the range.

14. The vehicle seat according to claim 13, wherein
on rear surface sides of the lower pad member and the upper pad member, there is disposed a displacement amount restricting fabric foamed integrally across the pad members and restricting displacement amounts of the upper side adjacent portion of the lower pad member and the lower side adjacent portion of the upper pad member.

15. The vehicle seat according to claim 1, wherein
a lumbar support mechanism is disposed between both side frames disposed on left and right sides of the back frame of the seat back part,
the lumbar support mechanism being constituted of a band-shaped lumbar support member having a band-shaped rubber with a predetermined length and a band-shaped fabric covering at least a front side of the rubber and stretched between the both side frames.

16. The vehicle seat according to claim 15, wherein
the band-shaped fabric constituting the band-shaped lumbar support member is constituted of a three-dimensional knitted fabric, and is integrated with the band-shaped rubber by sewing.

17. The vehicle seat according to claim 1, wherein
the pair of stringers making up the energy absorbing structure part of the cushion frame is coupled to the upper rails of the sliders, the pair of stringers disposed in a pair on left and right sides, and
a reference is designed in a range of 100 to 200 mm from a bottom surface of lower rails of the sliders.

18. The vehicle seat according to claim 17, wherein
all of the lower rails and the upper rails constituting the sliders are formed of a thin plate having a predetermined elasticity, and are structured such that shapes of the lower rails and the upper rails change so that a section modulus in a vertical direction increases by input of an impact force of a predetermined value or higher, to thereby absorb the impact force.

19. The vehicle seat according to claim 7, wherein
at least one of the third front beam and the rear beam is constituted of a torsion bar, and the vehicle seat further comprises a flat support member elastically supported via the torsion bar.

* * * * *